United States Patent
Ueno et al.

(10) Patent No.: US 11,125,924 B2
(45) Date of Patent: Sep. 21, 2021

(54) ONE-SIDE-PROTECTED POLARIZING FILM, PRESSURE-SENSITIVE-ADHESIVE-LAYER-ATTACHED POLARIZING FILM, IMAGE DISPLAY DEVICE, AND METHOD FOR CONTINUOUSLY PRODUCING SAME

(71) Applicant: NITTO DENKO CORPORATION, Ibaraki (JP)

(72) Inventors: Tomonori Ueno, Ibaraki (JP); Shinya Hiraoka, Ibaraki (JP); Hiromi Ikeshima, Ibaraki (JP); Atsushi Kishi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 371 days.

(21) Appl. No.: 16/089,679

(22) PCT Filed: Mar. 17, 2017

(86) PCT No.: PCT/JP2017/010974
§ 371 (c)(1),
(2) Date: Sep. 28, 2018

(87) PCT Pub. No.: WO2017/169917
PCT Pub. Date: Oct. 5, 2017

(65) Prior Publication Data
US 2020/0310018 A1 Oct. 1, 2020

(30) Foreign Application Priority Data
Mar. 28, 2016 (JP) .............................. JP2016-064266

(51) Int. Cl.
*G02B 5/30* (2006.01)
*B32B 7/12* (2006.01)
(Continued)

(52) U.S. Cl.
CPC .............. *G02B 5/3041* (2013.01); *B32B 7/12* (2013.01); *B32B 27/08* (2013.01); *B32B 27/20* (2013.01);
(Continued)

(58) Field of Classification Search
CPC ...... G02B 5/3041; G02B 5/3033; G02B 1/14; G02F 1/1335; B32B 7/12
(Continued)

(56) References Cited

U.S. PATENT DOCUMENTS 8,411,360 B2 * 4/2013 Kitagawa ................ B29C 65/00
359/487.06
8,721,816 B2 * 5/2014 Kitagawa ................ B32B 41/00
156/64

(Continued)

FOREIGN PATENT DOCUMENTS

CN 106104322 A 11/2016
JP 2003-227932 A 8/2003
(Continued)

OTHER PUBLICATIONS

International Search Report dated May 30, 2017, issued in counterpart International Application No. PCT/JP2017/010974 (2 pages).
(Continued)

*Primary Examiner* — Ricky D Shafer
(74) *Attorney, Agent, or Firm* — Westerman, Hattori, Daniels & Adrian, LLP

(57) ABSTRACT

The present invention is a one-side-protected polarizing film having a polarizer and a protective film provided on only one surface of the polarizer, wherein the polarizer contains a polyvinyl alcohol-based resin, has a thickness of 10 μm or less, and is configured so that optical properties represented by a single-body transmittance T and a polarization degree P satisfy the following relationship: $P>-(10^{0.929T-42.4}-1)\times$
(Continued)

100 (provided that T<42.3) or P≥99.9 (provided that T≥42.3), a transparent layer is provided on another surface of the polarizer, and a dynamic friction coefficient of the surface on which the protective film is provided is 0.2 or less. In this one-side-protected polarizing film, it is possible to resist the occurrence of through cracks and nano-slits even when the polarizer has specific optical properties and a thickness of 10 µm or less.

20 Claims, 6 Drawing Sheets

(51) Int. Cl.
  *B32B 27/08* (2006.01)
  *B32B 27/20* (2006.01)
  *B32B 27/30* (2006.01)
  *G02F 1/1335* (2006.01)

(52) U.S. Cl.
  CPC .......... *B32B 27/302* (2013.01); *G02F 1/1335* (2013.01)

(58) Field of Classification Search
  USPC .................................................. 359/485.03
  See application file for complete search history.

(56) References Cited

U.S. PATENT DOCUMENTS

| | | | |
|---|---|---|---|
| 10,067,268 B2* | 9/2018 | Mita | C08K 3/01 |
| 10,088,705 B2* | 10/2018 | Miyai | G02F 1/133528 |
| 10,094,954 B2* | 10/2018 | Xu | G02B 1/14 |
| 10,345,500 B2* | 7/2019 | Motegi | G02B 5/305 |
| 10,754,065 B2* | 8/2020 | Namiki | H01L 51/5281 |
| 2008/0113173 A1 | 5/2008 | Hayakawa et al. | |
| 2011/0025958 A1 | 2/2011 | Koshio et al. | |
| 2011/0043733 A1 | 2/2011 | Suzuki et al. | |
| 2012/0055607 A1 | 3/2012 | Kitagawa et al. | |
| 2012/0055608 A1 | 3/2012 | Kitagawa et al. | |
| 2012/0055621 A1 | 3/2012 | Goto et al. | |
| 2012/0055622 A1 | 3/2012 | Kitagawa et al. | |
| 2012/0055623 A1 | 3/2012 | Kitagawa et al. | |
| 2012/0056211 A1 | 3/2012 | Kitagawa et al. | |
| 2012/0056340 A1 | 3/2012 | Kitagawa et al. | |
| 2012/0057104 A1 | 3/2012 | Kitagawa et al. | |
| 2012/0057231 A1 | 3/2012 | Goto et al. | |
| 2012/0058291 A1* | 3/2012 | Kitagawa | G02B 27/288 428/43 |
| 2012/0058321 A1 | 3/2012 | Goto et al. | |
| 2014/0065429 A1 | 3/2014 | Kunikata et al. | |
| 2015/0185384 A1 | 7/2015 | Watanabe | |
| 2016/0018578 A1* | 1/2016 | Yonemoto | B32B 7/12 359/487.02 |
| 2016/0084996 A1 | 3/2016 | Kitagawa et al. | |
| 2017/0210915 A1* | 7/2017 | Lee | G02B 5/3033 |
| 2017/0299779 A1* | 10/2017 | Mita | C09J 129/04 |
| 2019/0049642 A1* | 2/2019 | Ueno | G02B 5/305 |

FOREIGN PATENT DOCUMENTS

| | | |
|---|---|---|
| JP | 2006-188661 A | 7/2006 |
| JP | 2008-257025 A | 10/2008 |
| JP | 2009-276757 A | 11/2009 |
| JP | 2010-9027 A | 1/2010 |
| JP | 4751481 B1 | 8/2011 |
| JP | 2013-160775 A | 8/2013 |
| JP | 2014-044387 A | 3/2014 |
| JP | 5871408 B1 | 3/2016 |
| KR | 2011-0007085 A | 1/2011 |
| KR | 2015-0011825 A | 2/2015 |
| TW | 201604261 A | 2/2016 |
| WO | 2013/191010 A1 | 12/2013 |
| WO | 2015/194523 A1 | 12/2015 |

OTHER PUBLICATIONS

Office Action dated Jun. 11, 2019, issued in counterpart JP application No. 2016-064266, with English translation. (10 pages).
Office Action dated May 26, 2020, issued in counterpart JP Application No. 2016-064266, with English Translation. (17 pages).
Office Action dated May 27, 2020, issued in counterpart CN Application No. 201780017633.5, with English Translation. (18 pages).
Office Action dated Jul. 9, 2020, issued in counterpart KR Application No. 10-2018-7029398, with English translation (11 pages).
Search Report dated Jun. 23, 2017, issued in counterpart TW Application No. 106109672, with English translation (2 pages).
Office Action dated Jan. 2, 2020, issued in counterpart KR application No. 10-2018-7029398, with English translation. (11 pages).
Office Action dated Jan. 28, 2020, issued in counterpart JP application No. 2016-064266, with English translation. (18 pages).
Notification of Transmittal of Translation of the International Preliminary Report on Patentability (Form PCT/IB/338) issued in counterpart International Application No. PCT/JP2017/010974 dated Oct. 11, 2018, with Forms PCT/IB/373 and PCT/ISA/237. (7 pages).
Office Action dated Mar. 31, 2021, issued in counterpart VN application No. 1-2018-04789, with English translation. (3 pages).

* cited by examiner

Fig.4A
(A) Normal one-side-protected polarizing film (before heating)

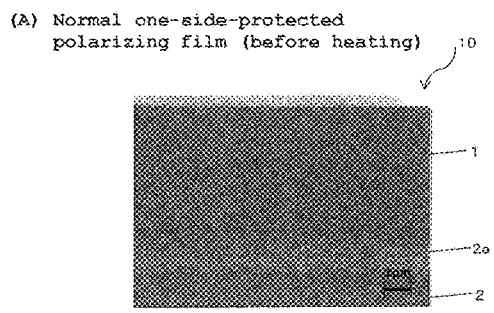

Fig.4B
(B) One-side-protected polarizing film suffering from nano-slit (before heating)

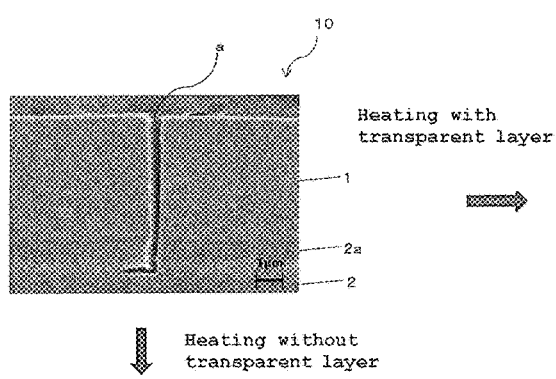

Heating with transparent layer

Heating without transparent layer

Fig.4D
(D) Transparent layer-attached one-side-protected polarizing film with no expanded nano-slit (after heating)

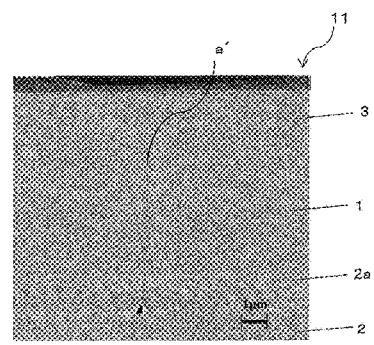

Fig.4C
(C) One-side-protected polarizing film with expanded nano-slit (after heating)

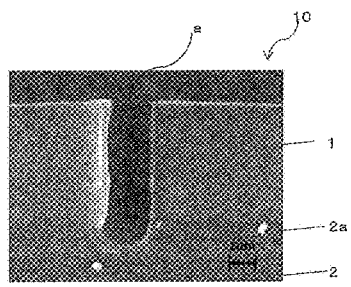

Absorption axis direction

Absorption axis direction

ONE-SIDE-PROTECTED POLARIZING FILM, PRESSURE-SENSITIVE-ADHESIVE-LAYER-ATTACHED POLARIZING FILM, IMAGE DISPLAY DEVICE, AND METHOD FOR CONTINUOUSLY PRODUCING SAME

TECHNICAL FIELD

The invention relates to a one-side-protected polarizing film including a polarizer and a protective film provided on only one surface of the polarizer and to a pressure-sensitive-adhesive-layer-attached polarizing film including the one-side-protected polarizing film and a pressure-sensitive adhesive layer. The one-side-protected polarizing film and the pressure-sensitive-adhesive-layer-attached polarizing film may be used alone or as a component of a multilayer optical film to form an image display device such as a liquid crystal display (LCD) or an organic electroluminescent (EL) display.

BACKGROUND ART

The image forming system of liquid crystal display devices has polarizing films placed as essential components on both sides of glass substrates that form the liquid crystal panel surfaces. A polarizing film generally used includes a polarizer and a protective film or films bonded to one or both surfaces of the polarizer with a polyvinyl alcohol-based adhesive or any other adhesive, in which the polarizer includes a polyvinyl alcohol-based film and a dichroic material such as iodine.

In general, a pressure-sensitive adhesive is used to bond such a polarizing film to a liquid crystal cell or any other component. The pressure-sensitive adhesive is provided as a pressure-sensitive adhesive layer in advance on one surface of the polarizing film because such a pressure-sensitive adhesive layer has advantages such as the ability to instantly fix the polarizing film and no need to perform a drying step for fixing the polarizing film. Thus, a pressure-sensitive-adhesive-layer-attached polarizing film is generally used when a polarizing film is bonded.

Polarizing films and pressure-sensitive-adhesive-layer-attached polarizing films have a problem in that in a harsh environment accompanied by thermal shock (e.g., a heat shock test in which −30° C. and 80° C. temperature conditions are repeated, or a test at a high temperature of 100° C.), the polarizer undergoes changes in shrinkage stress, so that cracks (through cracks) can easily occur entirely in the direction of the absorption axis of the polarizer. In other words, pressure-sensitive-adhesive-layer-attached polarizing films have insufficient durability to thermal shock in the harsh environment mentioned above. For thickness reduction, a pressure-sensitive-adhesive-layer-attached polarizing film can be produced using a one-side-protected polarizing film including a polarizer and a protective film provided on only one surface of the polarizer. Particularly, such a pressure-sensitive-adhesive-layer-attached polarizing film has insufficient durability to the thermal shock mentioned above. In addition, the thermal shock-induced through cracks become more likely to occur as the size of the polarizing film increases.

In order to suppress the occurrence of the through cracks, for example, it is proposed to provide a pressure-sensitive-adhesive-layer-attached polarizing film including a one-side-protected polarizing film, a protective layer provided on the polarizing film and having a tensile elastic modulus of 100 MPa or more, and a pressure-sensitive adhesive layer provided on the protective layer (Patent Document 1). It is also proposed to provide a pressure-sensitive-adhesive-layer-attached polarizing film including a polarizer with a thickness of 25 μm or less, a protective layer provided on one surface of the polarizer and including a product obtained by curing a curable resin composition, a protective film provided on the other surface of the polarizer, and a pressure-sensitive adhesive layer provided on the outer side of the protective layer (Patent Document 2). The pressure-sensitive-adhesive-layer-attached polarizing films described in Patent Documents 1 and 2 are effective in tams of suppressing the occurrence of through cracks. In addition, polarizers have also been reduced in thickness. For example, it is proposed to provide a thin polarizer having controlled optical properties including a controlled single-body transmittance and a controlled degree of polarization and also having high orientation (Patent Document 3).

PRIOR ART DOCUMENTS

Patent Documents

Patent Document 1: JP-A-2010-009027
Patent Document 2: JP-A-2013-160775
Patent Document 3: JP-B1-4751481

SUMMARY OF THE INVENTION

Problems to be Solved by the Invention

Patent Documents 1 and 2 disclose that a reduction in thickness is achieved by using a one-side-protected polarizing film having a protective film on only one surface of a polarizer, while a protective layer is provided to suppress the occurrence of through cracks in the direction of the absorption axis of the polarizer, which would otherwise be caused by the use of the one-side-protected polarizing film.

On the other hand, polarizers have also been reduced in thickness. When a thinner polarizer (e.g., 10 μm or less in thickness) is used to form a polarizing film or a pressure-sensitive-adhesive-layer-attached polarizing film, changes in shrinkage stress in the polarizer become smaller. Therefore, it has been found that the use of a thinner polarizer makes it possible to suppress the occurrence of through cracks.

However, it has been found that even through the occurrence of through cracks is suppressed in a one-side-protected polarizing film or a pressure-sensitive-adhesive-layer-attached polarizing film produced therewith, extremely-fine partial cracks (hereafter also referred to as nano-slits) can occur in the absorption axis direction of the polarizer when the optical properties are controlled and the polarizer used is thin (e.g., 10 μm or less in thickness) as described in Patent Document 3, and mechanical shock is applied to the one-side-protected polarizing film or the pressure-sensitive-adhesive-layer-attached polarizing film produced therewith (including a case where a load is applied to the polarizer side by downward bending). It has also been found that the nano-slits can occur regardless of the polarizing film size. It has also been found that the nano-slits do not occur when a double-side-protected polarizing film is used, which includes a polarizer and protective films on both surfaces of the polarizer. It has also been found that when a through crack occurs in a polarizer, any other through crack will not occur adjacent to the through crack because the stress around the through crack is released, and that in contrast, not only a nano-slit can occur alone but also nano-slits can occur adjacent to each other. It has also been found that a through crack once formed in a polarizer has the ability to progressively extend in the absorption axis direction of the polarizer, and that in contrast, nano-slits have no ability to progressively extend. Thus, it has been found that the nano-slit is a new problem that occurs when a thin polarizer with optical properties controlled within specific ranges is used to form a one-side-protected polarizing film in which the occurrence of through cracks is suppressed, and that the nano-slit is a problem caused by a phenomenon different from that responsible for the through crack.

In addition, the nano-slits, which are extremely fine, cannot be detected in a normal environment. Therefore, even if nano-slits occur in a polarizer, light leakage defects in the one-side-protected polarizing film or the pressure-sensitive-adhesive-layer-attached polarizing film produced therewith are difficult to find by only a glance. In other words, nano-slits are difficult to detect by automatic optical inspection, which is generally used for defect inspection of a one-side-protected polarizing film being produced in the form of a long strip. It has also been found that when one-side-protected polarizing films or pressure-sensitive-adhesive-layer-attached polarizing films are bonded to the glass substrates or other components of an image display panel and then placed in a heated environment, nano-slits can expand in the widthwise direction, so that nano-slit-induced defects can be detected (e.g., as the presence or absence of light leakage).

Thus, it is desired to suppress not only the occurrence of through cracks but also the occurrence of nano-slits in a one-side-protected polarizing film having a polarizer with a thickness of 10 or less or in a pressure-sensitive-adhesive-layer-attached polarizing film produced with such a one-side-protected polarizing film.

It is an object of the invention to provide a one-side-protected polarizing film that includes a polarizer and a protective film on only one surface of the polarizer and resists the occurrence of through cracks and nano-slits even when the polarizer has specific optical properties and a thickness of 10 μm or less. It is another object of the invention to provide a pressure-sensitive-adhesive-layer-attached polarizing film including such a one-side-protected polarizing film and a pressure-sensitive adhesive layer.

It is a further object of the invention to provide an image display device having such a one-side-protected polarizing film or such a pressure-sensitive-adhesive-layer-attached polarizing film and to provide a method for continuously producing such an image display device.

Means for Solving the Problems

As a result of intensive studies, the inventors have accomplished the invention based on findings that the problems can be solved by the one-side-protected polarizing film, the pressure-sensitive-adhesive-layer-attached polarizing film, and other means described below.

That is, the present invention relates to a one-side-protected polarizing film comprising, a polarizer; and a protective film provided on only one surface of the polarizer, wherein the polarizer contains a polyvinyl alcohol-based resin, has a thickness of 10 μm or less, and is configured so that optical properties represented by a single-body transmittance T and a polarization degree P satisfy the following relationship:

$$P > -(10^{0.929T-42.4}-1) \times 100 \text{ (provided that } T<42.3) \text{ or}$$

$$P \geq 99.9 \text{ (provided that } T \geq 42.3),$$

a transparent layer is provided on another surface of the polarizer, and a dynamic friction coefficient of the surface on which the protective film is provided is 0.2 or less.

In the one-side-protected polarizing film, the transparent layer is preferably a formed product of a resin material. As the transparent layer, a formed product of a forming material containing a polyvinyl alcohol-based resin or a foaming material containing an aqueous emulsion can be used.

In the one-side-protected polarizing film, the transparent layer having a thickness of 0.2 μm or more and 3 μm or less can be used.

In the one-side-protected polarizing film, as the protective film, a material having a surface treatment layer on its surface can be used. As the surface treatment layer, a low reflection treatment layer can be mentioned.

In the one-side-protected polarizing film, the polarizer preferably contains 20% by weight or less of boric acid based on the total weight of the polarizer.

Further, the present invention relates to a pressure-sensitive-adhesive-layer-attached polarizing film comprising: the one-side-protected polarizing film; and a pressure-sensitive adhesive layer.

The pressure-sensitive-adhesive-layer-attached polarizing film may be used in such a foam that the pressure-sensitive adhesive layer is provided on the transparent layer of the one-side-protected polarizing film. Alternatively, the pressure-sensitive-adhesive-layer-attached polarizing film maybe used in such a foam that the pressure-sensitive adhesive layer is provided on the protective film of the one-side-protected polarizing film. A separator may also be provided on the pressure-sensitive adhesive layer of the pressure-sensitive-adhesive-layer-attached polarizing film. The pressure-sensitive-adhesive-layer-attached polarizing film provided with the separator can be used in the form of a roll.

Further, the present invention relates to an image display device comprising the one-side-protected polarizing film or the pressure-sensitive-adhesive-layer-attached polarizing film.

Further, the present invention relates to a method for continuously producing an image display device, the method comprising the steps of:

unwinding the pressure-sensitive-adhesive-layer-attached polarizing film from the roll of the pressure-sensitive-adhesive-layer-attached polarizing film;

feeding the pressure-sensitive-adhesive-layer-attached polarizing film with the separator; and continuously bonding the pressure-sensitive-adhesive-layer-attached polarizing film to a surface of an image display panel with the pressure-sensitive adhesive layer interposed therebetween.

Further, the present invention relates to a method for continuously producing an image display device, the method comprising the steps of:

unwinding the pressure-sensitive-adhesive-layer-attached polarizing film from the roll of the pressure-sensitive-adhesive-layer-attached polarizing film;

feeding the pressure-sensitive-adhesive-layer-attached polarizing film with the separator; and continuously bonding the pressure-sensitive-adhesive-layer-attached polarizing film to a surface of an image display panel with the pressure-sensitive adhesive layer interposed therebetween.

Effect of the Invention

The one-side-protected polarizing film and the pressure-sensitive-adhesive-layer-attached polarizing film of the invention include a polarizer with a thickness of 10 μm or less and are made thin. The thin polarizer with a thickness of 10 μm or less resists the occurrence of through cracks because changes in the shrinkage stress applied to the polarizer by thermal shock are smaller in the thin polarizer than in thick polarizers.

On the other hand, nano-slits are more likely to occur in thin polarizers having specific optical properties. Nano-slits seem to occur when mechanical shock is applied to the one-side-protected polarizing film or the pressure-sensitive-adhesive-layer-attached polarizing film produced therewith, in the process of producing the one-side-protected polarizing film, in the process of producing the pressure-sensitive-adhesive-layer-attached polarizing film by forming a pressure-sensitive adhesive layer on the one-side-protected polarizing film, various processes after the production of the pressure-sensitive-adhesive-layer-attached polarizing film or after bonding the pressure-sensitive-adhesive-layer-attached polarizing film to an image display panel. Nano-slits are assumed to be caused by a mechanism different from that responsible for through cracks caused by thermal shock. In addition, when one-side-protected polarizing films or pressure-sensitive-adhesive-layer-attached polarizing films are bonded to the glass substrates or other components of an image display panel and then placed in a heated environment, nano-slits can expand in the widthwise direction, so that nano-slit-induced defects can be detected (e.g., as the presence or absence of light leakage).

In the one-side-protected polarizing film and the pressure-sensitive-adhesive-layer-attached polarizing film of the present invention, by providing a transparent layer on the other surface (the surface not having the protective film) of the polarizer, occurrence of nano-slits can be suppressed. Furthermore, in the present invention, by using a material having a dynamic friction coefficient of 0.2 or less of the surface (the surface not bonded to the polarizer) on which the protective film is provided, it is more effective to be able to suppress the occurrence of nano-slits.

As described above, the one-side-protected polarizing film and the pressure-sensitive-adhesive-layer-attached polarizing film using the same according to the present invention are provided with the transparent layer and effectively suppress occurrence of through cracks and nano-slits occurring in the polarizer while satisfying thinning by using a protective film having a predetermined dynamic friction coefficient.

The nano-slits, which are extremely fine, cannot be detected in a normal environment. Therefore, even if nano-slits occur in a polarizer, light leakage defects in the one-side-protected polarizing film or the pressure-sensitive-adhesive-layer-attached polarizing film produced therewith are difficult to find by only a glance. It has also been found that when the one-side-protected polarizing film or the pressure-sensitive-adhesive-layer-attached polarizing film is placed in a heated environment, nano-slits can expand in the widthwise direction, so that nano-slit-induced defects can be detected (e.g., as the presence or absence of light leakage). It has also been found that the use of the transparent layer is effective in suppressing the occurrence of such defects due to the expansion of nano-slits in the widthwise direction.

As mentioned above, nano-slits seem to occur in the polarizer even in the process of producing the one-side-protected polarizing film before the formation of the transparent layer. Even if nano-slits occur in the polarizer of a one-side-protected polarizing film obtained before the formation of the transparent layer, the expansion of the nano-slits in the widthwise direction can be suppressed by forming the transparent layer. In addition, even if mechanical shock is applied in various processes after the process of producing the one-side-protected polarizing film having the transparent layer or after the production of the pressure-sensitive-adhesive-layer-attached polarizing film, the transparent layer-attached polarizing film of the present invention can resist the occurrence of nano-slits.

BRIEF DESCRIPTION OF THE DRAWINGS

FIGS. 4A to 4D are exemplary photographs of cross-sections of one-side-protected polarizing films, which show the presence or absence of a nano-slit and show that heating-induced expansion of a nano-slit differs depending on the presence or absence of a transparent layer.

Hereinafter, the one-side-protected polarizing film 11 of the invention and the pressure-sensitive-adhesive-layer-attached polarizing film 12 of the invention will be described with reference to FIGS. 1A, 1B, 2A and 2B. As illustrated in FIG. 1A, a one-side-protected polarizing film 10 (without any transparent layer 3) includes, for example, a polarizer 1 and a protective film 2 on only one surface of the polarizer 1. In FIG. 1B, the case where a surface treatment layer X is provided on the surface of the protective film 2 (protective film 2') is shown. The dynamic friction coefficient of the surface (the surface not bonded to the polarizer) on which the protective film 2 (or 2') of the one-side-protected polarizing film 11 is 0.2 or less. In FIG. 1A, the protective film 2 having a dynamic friction coefficient of 0.2 or less of the surface is used, and in FIG. 1B, the protective film 2' having a dynamic friction coefficient of 0.2 or less of the surface treatment layer X is used. From the viewpoint of suppressing the occurrence of nano-slits, the dynamic friction coefficient is preferably 0.1 or less. Measurement of dynamic friction coefficient is as described in Examples. Although not shown, the polarizer 1 and the protective film 2 are laminated via an intervening layer such as an adhesive layer, a pressure-sensitive adhesive layer, and an undercoat layer (a primer layer). Although not shown, an adhesion facilitating layer or an activation treatment may be formed or performed on the protective film 2 of the one-side-protected polarizing film 10, and the adhesion facilitating layer and an adhesive layer may be stacked on each other. As illustrated in FIGS. 1A and 1B, the one-side-protected polarizing film 11 of the invention (with a transparent layer 3) includes the one-side-protected polarizing film 10 and a transparent layer 3 provided (directly) on one surface of the polarizer 1 (the surface opposite to its surface on which the protective film 2 is provided).

As illustrated in FIGS. 2A and 2B, the pressure-sensitive-adhesive-layer-attached polarizing film 12 of the invention includes the one-side-protected polarizing film 11 (with a transparent layer) and a pressure-sensitive adhesive layer 4. In the pressure-sensitive-adhesive-layer-attached polarizing film 12 of FIGS. 2A and 2B, an embodiment of one-side-protected polarizing film 11 shown in FIG. 1A is shown, and an embodiment shown in FIG. 1B can be similarly applied to the pressure-sensitive-adhesive-attached polarizing film 12. The pressure-sensitive adhesive layer 4 may be provided on the transparent layer 3 as illustrated in FIG. 2A or on the protective film 2 as illustrated in FIG. 2B. In addition, a separator 5 may be provided on the pressure-sensitive adhesive layer 4 of the pressure-sensitive-adhesive-layer-attached polarizing film 12 of the invention, and a surface protective film 6 may be provided on the opposite side of the film 12 from the separator 5. FIGS. 2A and 2B show cases where the separator 5 and the surface protective film 6 are both provided on the pressure-sensitive-adhesive-layer-attached polarizing film 12. The pressure-sensitive-adhesive-layer-attached polarizing film 12 provided with at least the separator 5 (and optionally further provided with the surface protective film 6) may be used in the form of a roll. For example, the roll is advantageously used in a process that includes unwinding the pressure-sensitive-adhesive-layer-attached polarizing film 12 from the roll, feeding the film 12 on the separator 5, and bonding the film 12 to the surface of an image display panel with the pressure-sensitive adhesive layer 4 interposed therebetween (hereinafter, such a method will also be referred to as a "roll-to-panel process", which is typically disclosed in JP-B1-4406043) so as to produce an image display device continuously. The pressure-sensitive-adhesive-layer-attached polarizing film preferably has the structure shown in FIG. 2A, for example, in order to suppress warpage of the display panel after the bonding and to suppress the occurrence of nano-slits. The surface protective film 6 may be provided on the one-side-protected polarizing film 10 and on the one-side-protected polarizing film 11 (with a transparent layer).

FIGS. 3A and 3B are schematic diagrams for comparing a nano-slit a and a through crack b, which can occur in the polarizer. FIG. 3A shows nano-slits a occurring in the polarizer 1, and FIG. 3B shows a through crack b occurring in the polarizer 1. The nano-slits a are caused by mechanical shock and partially occur in the direction of the absorption axis of the polarizer 1. The nano-slits a cannot be observed at the beginning of their formation, but become observable as they expand in the widthwise direction in a hot environment (e.g., at 80° C. or 60° C. and 90% RH). On the other hand, the nano-slits a are not considered to have the ability to progressively extend in the direction of the absorption axis of the polarizer. In addition, the nano-slits a are considered to occur regardless of the size of the polarizing film. Not only a single nano-slit a can occur alone, but also nano-slits a can occur adjacent to one another. On the other hand, the through crack b is caused by thermal shock (e.g., in a heat shock test). The through crack has the ability to progressively extend in the direction of the absorption axis of the polarizer, where the crack occurs. When a through crack b occurs, any other through crack will not occur adjacent thereto because the stress around it is released.

FIGS. 4A to 4D are exemplary photographs of the cross-section of the one-side-protected polarizing film 10 or the transparent layer-attached one-side-protected polarizing film 11 for showing the occurrence, expansion, and repair of a nano-slit a in the polarizer. FIG. 4A shows an example where no nano-slit occurs in a one-side-protected polarizing film 10 including a polarizer 1 and a protective film 2 on only one surface of the polarizer 1 with an adhesive layer 2a interposed therebetween. FIG. 4B shows an example where a nano-slit a occurs in the one-side-protected polarizing film 10. FIGS. 4A and 4B are both taken before heating. FIG. 4C is an exemplary photograph taken after heating of the cross-section of the one-side-protected polarizing film 10 in which a nano-slit a occurs. FIG. 4C shows that due to heating, the nano-slit a expands in the polarizer 1. On the other hand, FIG. 4D is an exemplary photograph of the cross-section taken after heating of the transparent layer-attached one-side-protected polarizing film 11 obtained by foaming a transparent layer 3 on the one-side-protected polarizing film 10 having the nano-slit a. FIG. 4D shows that the nano-slit a in the polarizer 1 is repaired (a') by the transparent layer 3 without expanding due to heating. FIGS. 4A to 4D are each obtained by cutting the cross-section of a sample perpendicularly to the direction of the absorption axis of the sample using a cross-section polisher or a microtome and then observing the cross-section with a scanning electron microscope.

<Polarizer>

Figure 1A:
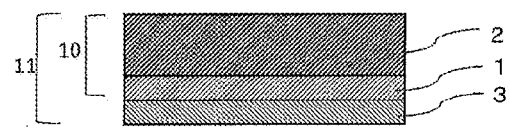
FIGS. 1A and 1B are schematic cross-sectional views of examples of the one-side-protected polarizing film of the invention.

In the invention, the polarizer used has a thickness of 10 µm or less. In order to reduce the thickness and suppress the occurrence of through cracks, the thickness of the polarizer is preferably 8 µm or less, more preferably 7 µm or less, even more preferably 6 µm or less. On the other hand, the thickness of the polarizer is preferably 2 µm or more, more preferably 3 µm or more. The polarizer with such a small thickness is less uneven in thickness, has good visibility, and is less dimensionally-variable and thus has high durability to thermal shock.

The polarizer used includes a polyvinyl alcohol-based resin. For example, the polarizer may be a product produced by a process including absorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film, or may be a polyene-based oriented film such as a film of a dehydration product of polyvinyl alcohol or a dehydrochlorination product of polyvinyl chloride. Among these polarizers, a polarizer including a polyvinyl alcohol-based film and a dichroic material such as iodine is preferred.

For example, a polarizer including a uniaxially-stretched polyvinyl alcohol-based film dyed with iodine can be produced by a process including immersing a polyvinyl alcohol film in an aqueous iodine solution to dye the film and stretching the film to 3 to 7 times the original length. If necessary, the film may also be immersed in an aqueous solution of potassium iodide or the like optionally containing boric acid, zinc sulfate, zinc chloride, or other materials. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

In view of stretching stability and optical durability, the polarizer preferably contains boric acid. In order to suppress the occurrence and expansion of through cracks and nano-slits, the content of boric acid in the polarizer is preferably 20% by weight or less, more preferably 18% by weight or less, even more preferably 16% by weight or less, based on the total weight of the polarizer. On the other hand, in view of the stretching stability and optical durability of the polarizer, the boron content is preferably 10% by weight or more, more preferably 12% by weight or more, based on the total weight of the polarizer.

Typical examples of the thin polarizer include the thin polarizers described in, for example, JP-B1-4751486, JP-B1-4751481, JP-B1-4815544, JP-B1-5048120, WO 2014/077599 A, and WO 2014/077636 A or thin polarizers obtained by the production methods described in these publications.

The polarizer is designed to have a single-body transmittance T and a polarization degree P that represent optical properties satisfying the condition of the following formula: $P>-(10^{0.929T-42.4}-1) \times 100$ (provided that T<42.3) or P≥99.9 (provided that T≥42.3). The polarizer designed to satisfy the condition uniquely has the performance required for a liquid crystal television display having a large display element. Specifically, such a display is required to have a contrast ratio of 1,000:1 or more and a maximum brightness of 500 $cd/m^2$ or more. In other applications, for example, the polarizer is bonded to the viewer side of an organic EL display device.

On the other hand, the polarizer designed to satisfy the condition includes a polymer (e.g., a polyvinyl alcohol-based molecule) having high orientation, which causes, together with the thickness of 10 μm or less, a significant reduction in the tensile rupture stress in the direction perpendicular to the absorption axis direction of the polarizer. This increases the possibility that nano-slits may occur in the direction of the absorption axis of the polarizer, for example, when the polarizer is exposed to mechanical shock beyond the tensile rupture stress in the process of producing the polarizing film. Therefore, the invention is particularly suitable for providing a one-side-protected polarizing film including the polarizer described above (or providing a pressure-sensitive-adhesive-layer-attached polarizing film including the polarizer described above).

The thin polarizer described above should be produced by a process capable of achieving high-ratio stretching to improve polarizing performance, among processes including the steps of stretching and dyeing a laminate. From this point of view, the thin polarizer is preferably obtained by a process including the step of stretching in an aqueous boric acid solution as described in JP-B1-4751486, JP-B1-4751481, or JP-B1-4815544, and more preferably obtained by a process including the step of performing auxiliary in-air stretching before stretching in an aqueous boric acid solution as described in JP-B1-4751481 or JP-B1-4815544. These thin polarizers can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage by stretching, because the layer is supported on the stretchable resin substrate.

<Protective Film>

The protective film is preferably made of a material having a high level of transparency, mechanical strength, thermal stability, water barrier properties, isotropy, and other properties. Examples of such a material include polyester-based polymers such as polyethylene terephthalate and polyethylene naphthalate, cellulose-based polymers such as diacetyl cellulose and triacetyl cellulose, acryl-based polymers such as polymethyl methacrylate, styrene-based polymers such as polystyrene and acrylonitrile-styrene copolymers (AS resins), and polycarbonate-based polymers. Examples of polymers that may be used to form the protective film also include polyolefin-based polymers such as polyethylene, polypropylene, cyclo-based or norbornene-structure-containing polyolefin, and ethylene-propylene copolymers, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinyl alcohol-based polymers, vinylidene chloride-based polymers, vinyl butyral-based polymers, arylate-based polymers, polyoxymethylene-based polymers, epoxy-based polymers, or any blends of the above polymers.

The protective film may also contain any type of one or more appropriate additives. Examples of such additives include ultraviolet absorbers, antioxidants, lubricants, plasticizers, release agents, discoloration preventing agents, flame retardants, nucleating agents, antistatic agents, pigments, and colorants. The content of the thermoplastic resin in the protective film is preferably from 50 to 100% by weight, more preferably from 50 to 99% by weight, even more preferably from 60 to 98% by weight, further more preferably from 70 to 97% by weight. If the content of the thermoplastic resin in the protective film is 50% by weight or less, high transparency and other properties inherent in the thermoplastic resin may fail to be sufficiently exhibited.

The protective film may also be, for example, a retardation film, a brightness enhancement film, or a diffusion film. The retardation film may have an in-plane retardation of 40 nm or more and/or a thickness direction retardation of 80 nm or more. The in-plane retardation is generally adjusted to fall within the range of 40 to 200 nm, and the thickness direction retardation is generally adjusted to fall within the range of 80 to 300 nm. When a retardation film is used as the protective film, the retardation film can also serve as a polarizer protecting film, which contributes to thickness reduction.

The retardation film may be a birefringent film formed by subjecting a thermoplastic resin film to uniaxial or biaxial stretching. The stretching temperature, the stretch ratio, and other conditions may be appropriately selected depending on the retardation value, the film material, and the thickness.

The thickness of the protective film may be selected as needed. In general, the thickness of the protective film is from about 1 to about 500 μm in view of strength, workability such as handleability, and thin layer formability. In particular, the thickness of the protective film is preferably from 1 to 300 μm, more preferably from 5 to 200 μm, even more preferably from 5 to 150 μm, further more preferably from 20 to 100 μm for thickness reduction.

As shown in FIG. 1A, when the protective film 2 itself becomes the surface of the one-side-protected polarizing film 11, a protective film that satisfies the dynamic friction coefficient of 0.2 or less of the surface is used. As the material that can satisfy the dynamic friction coefficient of 0.2 or less, for example, a film using an acryl-based polymer, a cellulose-based polymer, a polyester polymer or the like can be mentioned.

<<Surface Treatment Layer>>

Figure 1B:
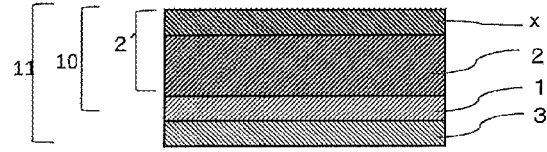

On the other hand, as shown in FIG. 1B, when the protective film 2' having a surface treatment layer x is used, the protective film 2' that satisfies the dynamic friction coefficient of 0.2 or less of the surface of the surface treatment layer x is used. In the protective film 2' having the surface treatment layer x, the protective film 2 may not be a material that satisfies a dynamic friction coefficient of 0.2 or less. As the surface treatment layer, a functional layer such as a hard coat layer, a low reflection treatment layer (antireflection layer), a sticking prevention layer, a diffusion layer, and an antiglare layer can be provided. The functional layer such as a hard coat layer, an antireflection layer, a sticking prevention layer, a diffusion layer and an antiglare layer can be provided on the protective film itself or separately from the protective film. The thickness of the surface treatment layer is not particularly limited, but usually it is about 0.5 to 20 µm.

<Intervening Layer>

The protective film and the polarizer are laminated with an intervening layer, such as an adhesive layer, a pressure-sensitive adhesive layer, or an undercoat layer (primer layer), between them. In this case, the intervening layer should preferably be used to laminate them with no air gap between them.

The adhesive layer is made from an adhesive. Any of various types of adhesives maybe used. The adhesive layer may be of any optically-transparent type. The adhesive may be any of various types, such as a water-based adhesive, a solvent-based adhesive, a hot melt-based adhesive, and an active energy ray-curable adhesive. A water-based adhesive or an active energy ray-curable adhesive is preferred.

The water-based adhesive may be, for example, an isocyanate-based adhesive, a polyvinyl alcohol-based adhesive, a gelatin-based adhesive, a vinyl-based adhesive, a latex-based adhesive, or a water-based polyester adhesive. The water-based adhesive is generally used in the form of an aqueous solution, which generally has a solids content of 0.5 to 60% by weight.

The active energy ray-curable adhesive is an adhesive capable of being cured by exposure to active energy rays such as electron beams or ultraviolet rays (a radically or cationically curable adhesive). The active energy ray-curable adhesive to be used may be of, for example, an electron beam-curable type or an ultraviolet-curable type. The active energy ray-curable adhesive may be, for example, a photo-radically curable adhesive. The photo-radically curable type active energy ray-curable adhesive may be of an ultraviolet-curable type. In this case, the adhesive should contain a radically polymerizable compound and a photopolymerization initiator.

The method for applying the adhesive is appropriately selected depending on the viscosity of the adhesive and the desired thickness. Examples of application means include a reverse coater, a gravure coater (direct, reverse, or offset), a bar reverse coater, a roll coater, a die coater, a bar coater, and a rod coater. Any other suitable application method such as dipping may also be used.

For example, when the water-based adhesive is used, the adhesive is preferably applied in such a manner that the finally formed adhesive layer can have a thickness of 30 to 300 nm. The adhesive layer more preferably has a thickness of 60 to 250 nm. On the other hand, when the active energy ray-curable adhesive is used, the adhesive layer is preferably formed with a thickness of 0.1 to 200 µm. The thickness is more preferably from 0.5 to 50 µm, even more preferably from 0.5 to 10 µm.

In the process of laminating the polarizer and the protective film, an adhesion-facilitating layer may be placed between the protective film and the adhesive layer. The adhesion-facilitating layer may be made of, for example, any of various resins having a polyester skeleton, a polyether skeleton, a polycarbonate skeleton, a polyurethane skeleton, a silicone skeleton, a polyamide skeleton, a polyimide skeleton, a polyvinyl alcohol skeleton, or other polymer skeletons. These polymer resins may be used singly or in combination of two or more. Other additives may also be added to form the adhesion-facilitating layer. More specifically, a tackifier, an ultraviolet absorber, an antioxidant, or a stabilizer such as a heat-resistant stabilizer may also be used to form the adhesion-facilitating layer.

The adhesion-facilitating layer is usually provided in advance on the protective film, and then the adhesion-facilitating layer side of the protective film is bonded to the polarizer with the adhesive layer. The adhesion-facilitating layer can be famed using a known technique that includes applying an adhesion-facilitating-layer-forming material onto the protective film and drying the material. The adhesion-facilitating-layer-forming material is generally prepared in the form of a solution which is diluted to a suitable concentration taking into account the coating thickness after drying, the smoothness of the application, and other factors. After dried, the adhesion-facilitating layer preferably has a thickness of 0.01 to 5 µm, more preferably 0.02 to 2 µm, even more preferably 0. 05 to 1 µm. Two or more adhesion-facilitating layers maybe provided. Also in this case, the total thickness of the adhesion-facilitating layers preferably falls within these ranges.

The pressure-sensitive adhesive layer is made from a pressure-sensitive adhesive. Any of various pressure-sensitive adhesives may be used, examples of which include rubber-based pressure-sensitive adhesives, acryl-based pressure-sensitive adhesives, silicone-based pressure-sensitive adhesives, polyurethane-based pressure-sensitive adhesives, vinyl alkyl ether-based pressure-sensitive adhesives, polyvinylpyrrolidone-based pressure-sensitive adhesives, polyacrylamide-based pressure-sensitive adhesives, and cellulose-based pressure-sensitive adhesives. The base polymer with adhesive properties is selected depending on the type of the pressure-sensitive adhesive. Among these pressure-sensitive adhesive adhesives, acryl-based pressure-sensitive adhesives are preferably used because they have a high level of optical transparency, weather resistance, heat resistance, and other properties, and exhibit an appropriate level of wettability and adhesive properties including cohesiveness and adhesiveness.

The undercoat layer (primer layer) is formed to improve the adhesion between the polarizer and the protective film. The primer layer may be made of any material capable of providing somewhat strong adhesion to both the base film and a polyvinyl alcohol-based resin layer. For example, a thermoplastic resin having a high level of transparency, thermal stability, and stretchability may be used to form the primer layer. Such a thermoplastic resin may be, for example, an acryl-based resin, a polyolefin-based resin, a polyester-based resin, a polyvinyl alcohol-based resin, or any mixture thereof.

<Transparent Layer>

In the one-side-protected polarizing film having the protective film provided on only one surface of the polarizer, the transparent layer is provided on the other surface of the polarizer (the surface opposite to its surface on which the protective film is placed). In the present invention, from the viewpoint of suppressing occurrence of nano-slits or suppressing the spread of nano-slits in the width direction in the case where the nano-slit occurs, the transparent layer having a compressive elastic modulus at 80° C. of 0.1 GPa or more is preferable. Even if a nano-slit occurs in the polarizer due to mechanical impact and the nano-slit tries to spread in the width direction under thermal environment, by controlling the compressive elastic modulus at 80° C. of the transparent layer to 0.1 GPa or more, it is possible to suppress the nano-slit spreading in the width direction by maintaining the mechanical holding ability of the transparent layer even in the thermal environment. The compressive elastic modulus of the transparent layer is preferably 0.5 GPa or more, more preferably 1 GPa or more, even more preferably 2 GPa or more. The compressive elastic modulus of the transparent layer can be adjusted by selecting the material. The 80° C. compressive elastic modulus of the transparent layer is the value measured by the method described in the EXAMPLES section.

From the viewpoint of thinning and optical reliability, the thickness of the transparent layer is preferably 3 μm or less, more preferably 2 μm or less, even more preferably 1.5 μm or less. On the other hand, the thickness of the transparent layer is preferably 0.2 μm or more, more preferably 0.6 μm or more, even more preferably 0.8 μm or more, from the viewpoint of suppression of nano-slits occurrence and expansion suppression effect of the nano-slits.

The transparent layer can be formed from any of various layer-forming materials. The transparent layer can be formed by, for example, applying a resin material to the polarizer or vapor-depositing an inorganic oxide such as $SiO_2$ on the polarizer by sputtering or other methods. The transparent layer is preferably formed from a resin material so that it can be easily famed.

As the resin material for forming the transparent layer, there can be exemplified a polyester-based resin, a polyether-based resin, a polycarbonate-based resin, a polyurethane-based resin, a silicone-based resin, a polyamide-based resin, a polyimide-based resin, a PVA-based resin, and an acryl-based resin. These resin materials maybe used singly or in combination of two or more thereof. Among them, one or more selected from the group consisting of a polyurethane-based resin and a PVA-based resin is preferred, and a PVA-based resin is more preferable. In addition, the form of the resin may be either an aqueous system or a solvent system. The form of the resin is preferably an aqueous resin. Among them, a forming material containing a polyvinyl alcohol-based resin or a forming material containing an aqueous emulsion is preferable.

As a material for forming the transparent layer, a material that permeates the polarizer is preferably used. As such a material for forming the transparent layer, for example, a forming material containing a water-soluble polyvinyl alcohol-based resin as a main component is preferable.

The polyvinyl alcohol-based resin may be, for example, polyvinyl alcohol. Polyvinyl alcohol can be obtained by saponifying polyvinyl acetate. The polyvinyl alcohol-based resin may also be a product produced by saponifying a copolymer of vinyl acetate and a monomer copolymerizable therewith. When the copolymerizable monomer is ethylene, an ethylene-vinyl alcohol copolymer can be obtained. Examples of the copolymerizable monomer include unsaturated carboxylic acids such as maleic acid (anhydride), fumaric acid, crotonic acid, itaconic acid, and (meth)acrylic acid, and esters thereof; α-olefins such as ethylene and propylene; (sodium) (meth)allylsulfonate, sodium sulfonate (monoalkyl maleate), sodium disulfonate alkyl maleate, N-methylolacrylamide, acrylamide alkyl sulfonate alkali salts, N-vinylpyrrolidone, and N-vinylpyrrolidone derivatives. These polyvinyl alcohol-based resins may be used singly or in combination of two or more thereof. From the viewpoint of satisfying moisture heat resistance and water resistance, polyvinyl alcohol obtained by saponifying polyvinyl acetate is preferable.

The polyvinyl alcohol-based resin can have a saponification degree of, for example, 95% by mole or more. In view of satisfying moisture heat resistance and water resistance, the polyvinyl alcohol-based resin preferably has a saponification degree of 99% by mole or more, more preferably 99.7% by mole or more. The saponification degree indicates the proportion of the units actually saponified to vinyl alcohol units in the units capable of being converted to vinyl alcohol units by saponification, and the residues are vinyl ester units. The saponification degree can be determined according to JIS K 6726-1994.

The average polymerization degree of the polyvinyl alcohol-based resin to be used may be, for example, 500 or more. However, from the viewpoint of satisfying moist heat resistance and water resistance, the polyvinyl alcohol-based resin preferably has an average polymerization degree of 1,000 or more, more preferably 1,500 or more, even more preferably 2,000 or more. The average polymerization degree of the polyvinyl alcohol-based resin is measured according to JIS-K 6726.

The polyvinyl alcohol-based resin to be used may also be a modified polyvinyl alcohol-based resin having a hydrophilic functional group on the side chain of the polyvinyl alcohol or copolymerized polyvinyl alcohol. The hydrophilic functional group may be, for example, an acetoacetyl group, a carbonyl group, and the like. In addition, a modified polyvinyl alcohol obtained by acetalization, urethanization, etherification, grafting, phosphoric esterification, or the like of a polyvinyl alcohol-based resin can be used.

The transparent layer can be formed from a forming material not containing a curable component. For example, the transparent layer can be formed from a forming material containing the polyvinyl alcohol-based resin (PVA-based resin) as a main component. The polyvinyl alcohol-based resin forming the transparent layer may be the same as or different from the polyvinyl alcohol-based resin contained in the polarizer, as long as it is a "polyvinyl alcohol-based resin".

The forming material containing the polyvinyl alcohol-based resin as a main component may contain a curable component (crosslinking agent) and the like. The content of the polyvinyl alcohol-based resin in the transparent layer or the foaming material (solid content) is preferably 80% by weight or more, more preferably 90% by weight or more, even more preferably 95% by weight or more. However, the forming material is preferably free of any curable component (crosslinking agent).

As the crosslinking agent, a compound having at least two functional groups reactive with the polyvinyl alcohol-based resin can be used. Examples of such a compound include alkylenediamines having an alkylene group and two amino groups, such as ethylenediamine, triethylenediamine, and hexamethylenediamine; isocyanates such as tolylene diisocyanate, hydrogenated tolylene diisocyanate, trimethylolpropane tolylene diisocyanate adducts, triphenylmethane triisocyanate, methylene bis(4-phenylmethane triisocyanate, isophorone diisocyanate, and ketoxime blocked compounds thereof or phenol blocked compounds thereof; epoxies such as ethylene glycol diglycidyl ether, polyethylene glycol diglycidyl ether, glycerin di- or tri-glycidyl ether, 1,6-hexanediol diglycidyl ether, trimethylolpropane triglycidyl ether, diglycidyl aniline, and diglycidyl amine; monoaldehydes such as formaldehyde, acetaldehyde, propionaldehyde, and butylaldehyde; dialdehydes such as glyoxal, malondialdehyde, succindialdehyde, glutardialdehyde, maleic dialdehyde, and phthaldialdehyde; amino-formaldehyde resins such as condensates of formaldehyde with methylolurea, methylolmelamine, alkylated methylolurea, alkylated methylolmelamine, acetoguanamine, or benzoguanamine; dicarboxylic acid dihydrazides such as adipic acid dihydrazide, oxalic acid dihydrazide, malonic acid dihydrazide, succinic acid dihydrazide, glutaric acid dihydrazide, isophthalic acid dihydrazide, sebacic acid dihydrazide, maleic acid dihydrazide, fumaric acid dihydrazide, and itaconic acid dihydrazide; water-soluble dihydrazines such as ethylene-1,2-dihydrazine, propylene-1,3-dihydrazine, and butylene-1,4-dihydrazine; and salts of divalent metals or trivalent metals such as sodium, potassium, magnesium, calcium, aluminum, iron, nickel and the like, and oxides thereof. Of these, amino-formaldehyde resins and water-soluble dihydrazines are preferred. The amino-formaldehyde resin is preferably a compound having a methylol group. Methylolmelamine is particularly suitable among the methylol group-containing compounds.

The curable component (crosslinking agent) can be used from the viewpoint of improving water resistance, and the content of the curable component is preferably 20 parts by weight or less, 10 parts by weight or less, or 5 parts by weight or less, per 100 parts by weight of the polyvinyl alcohol-based resin.

The forming material is prepared as a solution obtained by dissolving the polyvinyl alcohol-based resin in a solvent. Examples of the solvent include water, dimethyl sulfoxide, dimethylformamide, dimethylacetamide, N-methylpyrrolidone, various glycols, polyhydric alcohols such as trimethylolpropane, and amines such as ethylenediamine and diethylenetriamine. These solvents can be used singly or in combination of two or more thereof. Among them, an aqueous solution using water as the solvent is preferably used to form the forming material. The concentration of the polyvinyl alcohol-based resin in the forming material (e.g., an aqueous solution) is, but not particularly limited to, 0.1 to 15% by weight, preferably 0.5 to 10% by weight, in view of coatability and storage stability.

In addition, for the formation of the transparent layer, a forming material containing an aqueous emulsion resin can be preferably used. Here, the aqueous emulsion resin means resin particles emulsified in water (dispersion medium). The aqueous emulsion resin can be obtained by emulsion polymerization of a monomer component in the presence of an emulsifier. The transparent layer can be formed by directly applying a transparent layer foaming material containing an emulsion containing the aqueous emulsion resin to a polarizer, followed by drying.

The resin constituting the aqueous emulsion resin is not particularly limited, and examples thereof include acryl-based resins, silicone-based resins, polyurethane-based resins, fluorine resins, and the like. Among these, polyurethane-based resins and acryl-based resins are preferred in the present invention from the viewpoint of excellent optical transparency and excellent weather resistance, heat resistance, and the like.

Besides, the transparent layer can be formed from a curable type forming material containing a curable component (the transparent layer is a cured product of the curable type forming material). The curable component can be broadly classified into an active energy ray-curable type such as an electron beam-curable type, an ultraviolet-curable type, or a visible light-curable type; and a thermosetting type. The ultraviolet-curable type and the visible light-curable type can be further classified into a radically polymerizable curable type and a cationically polymerizable curable type. In the invention, active energy rays in the wavelength range of 10 nm to less than 380 nm are called ultraviolet rays or ultraviolet light, and active energy rays in the wavelength range of 380 nm to 800 nm are called visible rays or visible light. The curable component of the radically polymerizable curable material can be used as a thermosetting curable component.

<<Radically Polymerizable, Curable, Layer-Foaming Material>>

Examples of the curable component include radically polymerizable compounds. Radically polymerizable compounds include compounds having a radically-polymerizable carbon-carbon double bond-containing functional group, such as a (meth) acryloyl group or a vinyl group. The curable component maybe any of a monofunctional radically polymerizable compound or a bifunctional or polyfunctional radically polymerizable compound. These radically polymerizable compounds maybe used singly or in combination of two or more. These radically polymerizable compounds are preferably, for example, (meth) acryloyl group-containing compounds. In the invention, the team "(meth)acryloyl" means acryloyl and/or methacryloyl, and hereinafter, "(meth)" is used in the same meaning.

In addition, as a material for foaming the transparent layer, for example, a cyanoacrylate-based forming material, an epoxy-based forming material, or an isocyanate-based foaming material can be used.

<Pressure-Sensitive Adhesive Layer>

The pressure-sensitive adhesive layer may be formed using any appropriate type of pressure-sensitive adhesive. Examples of the pressure-sensitive adhesive include a rubber-based pressure-sensitive adhesive, an acryl-based pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, and a cellulose-based pressure-sensitive adhesive.

Among these pressure-sensitive adhesives, those having a high level of optical transparency and weather resistance or heat resistance and exhibiting an appropriate level of wettability and adhesive properties such as cohesiveness and adhesiveness are preferably used. An acryl-based pressure-sensitive adhesive is preferably used because it has such properties.

Figure 2A:
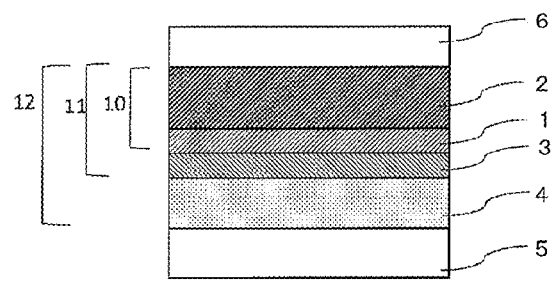
FIGS. 2A and 2B are schematic cross-sectional views of examples of the pressure-sensitive-adhesive-layer-attached polarizing film of the invention.
Figure 2B:
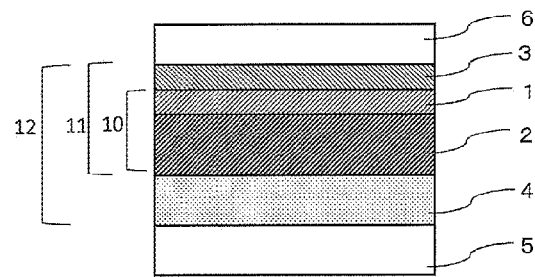
Figure 3A:
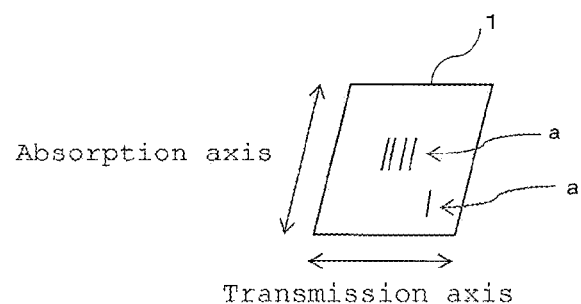
FIGS. 3A and 3B are exemplary schematic diagrams for a comparison between a nano-slit and a through crack occurring in a polarizer.
Figure 3B:
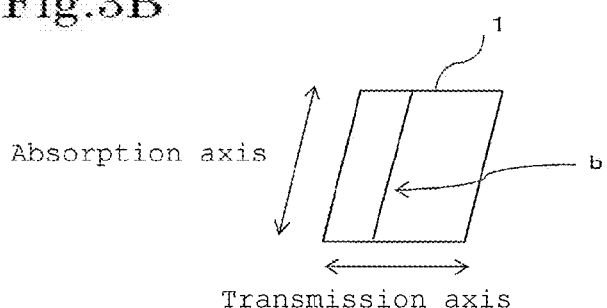

The pressure-sensitive adhesive layer can be formed by a method including applying the pressure-sensitive adhesive to a release-treated separator or other means, removing the polymerization solvent and other components from the adhesive by drying to foam a pressure-sensitive adhesive layer, and then transferring the pressure-sensitive adhesive layer onto the polarizer in the embodiment of FIG. 2A (or onto the protective film in the embodiment of FIG. 2B). Alternatively, the pressure-sensitive adhesive layer can be famed by a method including applying the pressure-sensitive adhesive to the polarizer in the embodiment of FIG. 2A (or to the protective film in the embodiment of FIG. 2B) and removing the polymerization solvent and other components from the adhesive by drying to form a pressure-sensitive adhesive layer on the polarizer. In the process of applying the pressure-sensitive adhesive, if necessary, one or more solvents other than the polymerization solvent may be newly added to the adhesive.

A silicone release liner is preferably used as the release-treated separator. In the invention, the pressure-sensitive adhesive may be applied to such a liner and then dried to form a pressure-sensitive adhesive layer. In this process, any appropriate method may be used for drying the pressure-sensitive adhesive, depending on purpose. Preferably, a method of heating and drying the coating film is used. The heating and drying temperature is preferably from 40° C. to 200° C., more preferably from 50° C. to 180° C., even more preferably from. 70° C. to 170° C. When the heating temperature is set in the range, a pressure-sensitive adhesive with a high level of adhesive properties can be obtained.

Any appropriate drying time may be used as needed. The drying time is preferably from 5 seconds to 20 minutes, more preferably from 5 seconds to 10 minutes, even more preferably from 10 seconds to 5 minutes.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or other means.

The thickness of the pressure-sensitive adhesive layer is typically, but not limited to, about 1 to about 100 µm, preferably 2 to 50 µm, more preferably 2 to 40 µm, even more preferably 5 to 35 µm.

When the pressure-sensitive adhesive layer is exposed, the pressure-sensitive adhesive layer may be protected by a release-treated sheet (separator) until it is actually used.

Examples of the material used to form such a separator include a plastic film such as a polyethylene, polypropylene, polyethylene terephthalate, or polyester film, a paper, a cloth, a porous material such as nonwoven fabric, and appropriate thin materials such as a net, a foamed sheet, a metal foil, and any laminate thereof. A plastic film is preferably used because of its good surface smoothness.

Such a plastic film may be of any type capable of protecting the pressure-sensitive adhesive layer. Such a plastic film may be, for example, a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, or an ethylene-vinyl acetate copolymer film.

The separator generally has a thickness of about 5 to about 200 µm, preferably about 5 to about 100 µm. If necessary, the separator may be subjected to a release treatment and an anti-pollution treatment with a silicone-based, fluoride-based, long-chain alkyl-based, or fatty acid amide-based release agent, a silica powder, or other materials, or subjected to an antistatic treatment of coating type, kneading and mixing type, vapor-deposition type, or other types. In particular, when the surface of the separator is appropriately subjected to a release treatment such as a silicone treatment, a long-chain alkyl treatment, or a fluorine treatment, the releasability from the pressure-sensitive adhesive layer can be further improved.

<Surface Protective Film>

A surface protective film may be provided on the one-side-protected polarizing film or the pressure-sensitive-adhesive-layer-attached polarizing film. The surface protective film generally has a base film and a pressure-sensitive adhesive layer. The surface protective film protects the polarizer with the pressure-sensitive adhesive layer interposed between them.

In view of the ability to be tested or managed, an isotropic or nearly-isotropic film material should be selected as the base film for the surface protective film. Examples of such a film material include polyester-based resins such as polyethylene terephthalate films, cellulose-based resins, acetate-based resins, polyethersulfone-based resins, polycarbonate-based resins, polyamide-based resins, polyimide-based resins, polyolefin-based resins, acryl-based resins, and other transparent polymers. In particular, polyester-based resins are preferred. The base film may be made of a single film material or a laminate of two or more film materials. The base film may also be a product obtained by stretching the film. The base film generally has a thickness of 500 µm or less, preferably 10 to 200 µm.

The pressure-sensitive adhesive used to form the pressure-sensitive adhesive layer for the surface protective film may be appropriately selected from pressure-sensitive adhesives including, as a base polymer, a (meth)acryl-based polymer, a silicone-based polymer, polyester, polyurethane, polyamide, polyether, fluoride-based polymer, rubber-based polymer, or any other polymer. An acrylic pressure-sensitive adhesive containing an acryl-based polymer as a base polymer is preferred in view of transparency, weather resistance, heat resistance, and other properties. The thickness (dry thickness) of the pressure-sensitive adhesive layer is selected depending on the desired adhesive strength. The thickness of the pressure-sensitive adhesive is generally from about 1 to about 100 µm, preferably from 5 to 50 µm.

A silicone, long-chain alkyl, or fluorine treatment with a low-adhesion material may also be performed to foam a release treatment layer on the surface of the base film of the surface protective film, opposite to its surface on which the pressure-sensitive adhesive layer is provided.

<Other Optical Layers>

For practical use, the one-side-protected polarizing film of the invention or the pressure-sensitive-adhesive-layer-attached polarizing film of the invention may be laminated with any other optical layer or layers to form an optical film. As a non-limiting example, such an optical layer or layers may be one or more optical layers that have ever been used to form liquid crystal display devices or other devices, such as a reflector, a transflector, a retardation plate (including a wavelength plate such as a half or quarter wavelength plate), or a viewing angle compensation film. Particularly preferred is a reflective or transflective polarizing film including a laminate of the one-side-protected polarizing film of the invention and a reflector or a transflector, an elliptically or circularly polarizing film including a laminate of the polarizing film of the invention and a retardation plate, a wide viewing angle polarizing film including a laminate of the polarizing film of the invention and a viewing angle compensation film, or a polarizing film including a laminate of the polarizing film of the invention and a brightness enhancement film.

The optical film including a laminate of the above optical layer and the one-side-protected polarizing film or the pressure-sensitive-adhesive-layer-attached polarizing film may be formed by a method of stacking them one by one, for example, in the process of manufacturing a liquid crystal display device. However, the optical film should be formed by stacking them in advance, which is superior in quality stability or assembling workability and thus advantageous in facilitating the process of manufacturing liquid crystal display devices or other devices. In the lamination, any appropriate bonding means such as a pressure-sensitive adhesive layer may be used. When the pressure-sensitive-adhesive-layer-attached polarizing film and any other optical film are bonded together, their optical axes may be each aligned at an appropriate angle, depending on the desired retardation properties or other desired properties.

The one-side-protected polarizing film, the pressure-sensitive-adhesive-layer-attached polarizing film, or the optical film according to the invention is preferably used to form various image display devices such as liquid crystal display devices and organic EL display devices. Liquid crystal display devices may be formed according to conventional techniques. Specifically, a liquid crystal display device may be typically formed according to any conventional techniques by appropriately assembling a liquid crystal cell, pressure-sensitive-adhesive-layer-attached polarizing films or optical films, and optional components such as a lighting system, incorporating a driving circuit, and performing other processes, except that the one-side-protected polarizing film, the pressure-sensitive-adhesive-layer-attached polarizing film, or the optical film according to the invention is used. The liquid crystal cell to be used may also be of any type, such as IPS type or VA type. The invention is particularly suitable for IPS type.

Any desired liquid crystal display device may be formed, such as a liquid crystal display device including a liquid crystal cell and the one-side-protected polarizing film or films, the pressure-sensitive-adhesive-layer-attached polarizing film or films, or the optical film or films placed on one or both sides of the liquid crystal cell, or a liquid crystal display device further including a backlight or a reflector in the lighting system. In such a case, the pressure-sensitive-adhesive-layer-attached polarizing film or films or the optical film or films according to the invention may be placed on one or both sides of the liquid crystal cell. When the one-side-protected polarizing films, the pressure-sensitive-adhesive-layer-attached polarizing films, or the optical films are provided on both sides, they may be the same or different. The process of forming the liquid crystal display device may also include placing, at an appropriate position or positions, one or more layers of an appropriate component such as a diffusion plate, an antiglare layer, an anti-reflection film, a protective plate, a prism array, a lens array sheet, a light diffusion plate, or a backlight.

EXAMPLES

Hereinafter, the invention will be more specifically described with reference to examples. It will be understood that the examples shown below are not intended to limit the invention. In each example, "parts" and "%" are all by weight. Unless otherwise specified below, the conditions of standing at room temperature include 23° C. and 65% RH in all cases.

<Preparation of Polarizer A1>

A corona treatment was performed on one surface of an amorphous isophthalic acid-copolymerized polyethylene terephthalate (IPA-copolymerized PET) film substrate (100 µm in thickness) with a water absorption of 0.75% and a Tg of 75° C. An aqueous solution containing polyvinyl alcohol (4,200 in polymerization degree, 99.2% by mole in saponification degree) and acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0% by mole or more in saponification degree) in a ratio of 9:1 was applied to the corona-treated surface at 25° C. and then dried to form a 11-µm-thick PVA-based resin layer, so that a laminate was formed.

In an oven at 120° C., the resulting laminate was subjected to free-end uniaxial stretching to 2.0 times in the longitudinal direction between rolls at different peripheral speeds (auxiliary in-air stretching).

Subsequently, the laminate was immersed in an insolubilization bath (an aqueous boric acid solution obtained by adding 4 parts by weight of boric acid to 100 parts by weight of water) at a temperature of 30° C. for 30 seconds (insolubilization).

Subsequently, the laminate was immersed in a dyeing bath at a temperature of 30° C. while the iodine concentration and the immersion time were so controlled as to allow the resulting polarizing plate to have a predetermined transmittance. In this example, the laminate was immersed for 60 seconds in an aqueous iodine solution obtained by adding 0.2 parts by weight of iodine and 1.0 part by weight of potassium iodide to 100 parts by weight of water (dyeing).

Subsequently, the laminate was immersed for 30 seconds in a crosslinking bath (an aqueous boric acid solution obtained by adding 3 parts by weight of potassium iodide and 3 parts by weight of boric acid to 100 parts by weight of water) at a temperature of 30° C. (crosslinking).

The laminate was then uniaxially stretched to a total stretch ratio of 5.5 times in the longitudinal direction between rolls at different peripheral speeds while it was immersed in an aqueous boric acid solution (an aqueous solution obtained by adding 3.75 parts by weight of boric acid and 5 parts by weight of potassium iodide to 100 parts by weight of water) at a temperature of 70° C. (in-water stretching).

The laminate was then immersed in a cleaning bath (an aqueous solution obtained by adding 4 parts by weight of potassium iodide to 100 parts by weight of water) at a temperature of 30° C. (cleaning).

The resulting product was an optical film laminate A1 including a 5-µm-thick polarizer Al. The optical properties of the obtained polarizer Al were as follows: a transmittance of 42.8% and a polarization degree of 99.99%.

<Preparation of Polarizer A2>

An optical film laminate A2 including a polarizer A2 was obtained in the same manner as in the method for preparing the polarizer A1, except that a PVA-based resin layer having a thickness of 15 µm was formed in the preparation of the polarizer A1. The obtained polarizer A2 had a thickness of 7 µm. The optical properties of the obtained polarizer A2 were as follows: a transmittance of 42.8% and a polarization degree of 99.99%.

<Preparation of Polarizer B (12-µm-Thick Polarizer)>

A 30-µm-thick polyvinyl alcohol film with an average degree of polymerization of 2,400 and a degree of saponification of 99.9% by mole was immersed in warm water at 30° C. for 60 seconds so that it was allowed to swell. Subsequently, the film was immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer B. The obtained polarizer B had a thickness of 12 µm. The optical properties of the obtained polarizer B were as follows: a transmittance of 42.8% and a polarization degree of 99.99%.

<Preparation of Protective Film (1)>

Resin pellets were prepared by mixing 100 parts by weight of the imidized MS resin described in Production Example 1 of JP-A-2010-284840 and 0.62 parts by weight of a triazine-based ultraviolet absorber (trade name T-712, manufactured by ADEKA CORPORATION) in a biaxial kneader at 220° C. The resulting pellets were dried at 100.5 kPa and 100° C. for 12 hours and then extruded into a film (160 µm thick) from the T-die of a uniaxial extruder at a die temperature of 270° C. The film was then stretched in the film-feed direction under an atmosphere at 150° C. (to a thickness of 80 µm) and then stretched in the direction perpendicular to the film-feed direction under an atmosphere of 150° C. to obtain a protective film (1) of a (meth) acryl-based resin film having a thickness of 40 µm. The obtained protective film (1) had a light transmittance of 8.5% at a wavelength of 380 nm, an in-plane retardation Re of 0.4 nm, and a thickness direction retardation Rth of 0.78 nm. The moisture permeability of the substrate film A thus obtained was 61 g/m$^2$·24 hr. The light transmittance was measured at a wavelength range of 200 nm to 800 nm using a spectrophotometer (device name: U-4100) manufactured by Hitachi High-Tech Corporation, and the transmittance at a wavelength of 380 nm was read. The retardation value was measured at a wavelength of 590 nm at 23° C. using a trade name "KOBRA 21-ADH" manufactured by Oji Scientific Instruments. The moisture permeability was measured by a method according to JIS K 0208 under conditions of a temperature of 40° C. and a relative humidity of 92%.

<Preparation of Protective Film (2)>

The easy adhesion-treated surface of the (meth)acrylic resin film having a lactone ring structure with a thickness of 40 µm was subjected to corona treatment and the resin film was then used.

<Preparation of Protective Film (3)>

Seventy parts by weight of ultraviolet curable urethane acrylate resin (trade name "UV 1700B", manufactured by Nippon Synthetic Chemical Industry Co., Ltd., solid content 100%) as the resin contained in the coating liquid, and 30 parts by weight of a polyfunctional acrylate (trade name "Viscoat #300", manufactured by Osaka Organic Chemical Industry Ltd., solid content 100%) containing pentaerythritol triacrylate as a main component were prepared. Two parts by weight of copolymer particles of acryl and styrene (trade name "Techpolymer", manufactured by Sekisui Plastics Co., Ltd., weight average particle diameter: 3.0 µm, refractive index: 1.52), 0.4 parts by weight of a synthetic smectite which is an organoclay (trade name "Lucentite SAN", manufactured by Co-op Chemical Co., Ltd.) as a thixotropy-imparting agent, 3 parts by weight of a photopolymerization initiator (trade name "IRGACURE 907", manufactured by BASF) and 0.5 parts by weight of a leveling agent (trade name "GRANDIC PC 4100", manufactured by DIC Corporation, solid content 10%) were mixed per 100 parts by weight of the resin solid content of the resin described above. Note that the organoclay was diluted with toluene so as to have a solid content of 6%. This mixture was diluted with a mixed solvent of toluene/cyclopentanone (CPN) (weight ratio 80/20) so that the solid content concentration became 50% by weight and treated with an ultrasonic disperser to prepare a coating solution. As a translucent substrate, a coating film was famed on the protective film (1) obtained above so that the hard coat after curing had a thickness of 7.0 µm. Subsequently, the coated film was dried at 90° C. for 2 minutes and irradiated by ultraviolet light with an integrated light amount of 300 mJ/cm$^2$ using a high-pressure mercury lamp, and the coating film was cured to obtain a protective film (3) having an antiglare treated layer.

<Preparation of Protective Film (4)>

Using a UV-curable fluorine resin (trade name "JUA-204" manufactured by JSR Corporation, solid content concentration: 10.0% by weight, diluent solvent: methyl isobutyl ketone (MIBK)), the resin was diluted with MIBK so that the solid content concentration became 1.70% to prepare a coating liquid for foaming an antireflection layer. Subsequently, the antireflective coating liquid for foaming an antireflection layer was coated with a wire bar on the surface of the antiglare treated layer of the protective film (3) obtained above, thereby to form a coating film having a thickness of 0.1 µm of the low reflection treated layer (antireflection layer) after curing. Then, the coated film was dried at 60° C. for 1 minute, irradiated by ultraviolet light with an integrated light amount of 300 mJ/cm$^2$ using a high-pressure mercury lamp, and the coated film was cured to obtain a protective film (4) having a low reflection treatment layer.

<Preparation of Protective Film (5)>

Five parts of a photopolymerization initiator (trade name "IRGACURE 907", manufactured by Ciba Japan K.K.) and 0.01 parts of a leveling agent (trade name "GRANDIC PC4100", manufactured by DIC Corporation) were added to a resin solution (trade name "Unidic 17-806" having a solid content concentration of 80%, manufactured by DIC Corporation) in which an ultraviolet curable resin monomer or oligomer mainly composed of urethane acrylate was dissolved in butyl acetate, per 100 parts of the solid content in the resin solution. Cyclopentanone (hereinafter referred to as "CPN") and propylene glycol monomethyl ether (hereinafter referred to as "PGM") in a ratio of 45:55 were added to this solution, so that the solid content concentration in the solution was 36%. In this way, a hard coat layer forming material for forming a hard coat layer was prepared. A coating film was formed on the protective film (1) obtained above using the hard coat layer forming material so that the thickness of the hard coat after curing was 7.5 µm. Subsequently, the coated film was dried at 90° C. for 1 minute, then irradiated by ultraviolet light with an integrated light amount of 300 mJ/cm$^2$ using a high-pressure mercury lamp, and the coating film was cured to obtain a protective film (5) having a hard coat layer.

<Preparation of Adhesive to be Applied to Protective Film>

Forty parts by weight of N-hydroxyethyl acrylamide (HEAA), 60 parts by weight of acryloyl morpholine (ACMO) and 3 parts by weight of a photoinitiator "IRGACURE 819" (manufactured by BASF) were mixed to prepare an ultraviolet curable adhesive.

<Material for Foaming Transparent Layer: Polyvinyl Alcohol (PVA)-based Foaming Material>

A polyvinyl alcohol resin having a polymerization degree of 2500 and a saponification degree of 99.0 mol % was dissolved in pure water to prepare an aqueous solution having a solid content concentration of 4% by weight.

<Formulation of Pressure-Sensitive Adhesive Layer>

A reaction vessel equipped with a condenser tube, a nitrogen inlet tube, a thermometer, and a stirrer was charged with 100 parts of butyl acrylate, 3 parts of acrylic acid, 0.1 parts of 2-hydroxyethyl acrylate, 0.3 parts of 2,2'-azobisisobutyronitrile, and ethyl acetate, so that a solution was obtained. Subsequently, the solution was allowed to react at 55° C. for 8 hours under stirring with nitrogen gas being blown into the solution, so that a solution containing an acryl-based polymer with a weight average molecular weight of 2,200,000 was obtained. Ethyl acetate was further added to the acryl-based polymer-containing solution to form an acryl-based polymer solution with an adjusted solid concentration of 30%.

A pressure-sensitive adhesive solution was prepared by adding 0.5 parts of a crosslinking agent (CORONATE L (trade name) manufactured by Nippon Polyurethane Industry Co., Ltd.) including an isocyanate group-containing compound as a main component and 0.075 parts of γ-glycidoxypropyltrimethoxysilane (KBM-403 (trade name) manufactured by Shin-Etsu Chemical Co., Ltd.) as a silane coupling agent in this order to the acryl-based polymer solution based on 100 parts of the solids of the acryl-based polymer solution. The pressure-sensitive adhesive solution was applied to the surface of a release sheet (separator) made of a release-treated polyethylene terephthalate film (38 μm in thickness) in such a manner that a 25-μm-thick coating could be famed after drying, and then dried to form a pressure-sensitive adhesive layer.

Example 1

(Preparation of One-Side-Protected Polarizing Film A1)

The protective film was bonded to the surface of a polarizer A1 of the optical film laminate with the ultraviolet-curable adhesive being applied to the surface in such a manner as to form a 0.5-μm-thick adhesive layer after curing. Subsequently, the adhesive was cured by applying ultraviolet rays as active energy rays. The ultraviolet rays were applied using the following conditions: gallium-containing metal halide lamp; irradiator, Light Hammer 10 manufactured by Fusion UV Systems, Inc; valve, V valve; peak illuminance, 1,600 mW/cm$^2$; total dose, 1,000/mJ/cm$^2$ (wavelength 380-440 nm). The illuminance of the ultraviolet rays was measured with Sola-Check System manufactured by Solatell Ltd. Subsequently, the amorphous PET substrate was removed from the product, so that a one-side-protected polarizing film A1 using a thin polarizer was prepared.

(Preparation of Transparent-Layer-Attached One-Side-Protected Polarizing Film)

The PVA-based forming material was coated on the surface (polarizer surface not provided with a protective film) of the polarizer of the one-side-protected polarizing film A1 using a wire bar coater so as to have a thickness of 1 μm, then dried at 80° C. for 30 seconds in a hot air to form a transparent layer, thereby preparing a transparent-layer-attached one-side-protected polarizing film.

<Preparation of Pressure-Sensitive-Adhesive-Layer-Attached Polarizing Film>

Subsequently, the pressure-sensitive adhesive layer formed on the release-treated surface of the release sheet (separator) was attached to the transparent layer formed on the one-side-protected polarizing film, so that a pressure-sensitive-adhesive-layer-attached polarizing film was obtained.

Examples 2 to 7 and Comparative Examples 1 to 3

In the same manner as in Example 1 except that the type (thickness) of the polarizer, the material for forming the transparent layer, and the thickness were changed as shown in Table 1, a one-side-protected polarizing film, a transparent-layer-attached one-side-protected polarizing film, and a pressure-sensitive-adhesive-layer-attached polarizing film were prepared. In Comparative Examples 1 and 3, no transparent layer was formed.

The pressure-sensitive-adhesive-layer-attached polarizing films obtained in the above Examples and Comparative Examples were evaluated as follows. The results are shown in Table 1. The following evaluations were all carried out under the conditions of 23° C. and 65% RH unless otherwise specified.

<Single-Body Transmittance T and Polarization Degree P of Polarizer>

The single-body transmittance T and polarization degree P of the resulting one-side-protected polarizing films were measured using an integrating sphere-equipped spectral transmittance meter (DOT-3C manufactured by Murakami Color Research Laboratory Co., Ltd.).

The polarization degree P is calculated from the formula below using the transmittance (parallel transmittance Tp) of a laminate of the same two polarizing films with their transmission axes parallel to each other and the transmittance (crossed transmittance Tc) of a laminate of the same two polarizing films with their transmission axes orthogonal to each other. Polarization degree P (%)=$\{(Tp-Tc)/(Tp+Tc)\}^{1/2} \times 100$ Each transmittance was expressed as the Y value, which was obtained through luminosity correction using the two-degree field (illuminant C) according to JIS Z 8701 when the transmittance for completely polarized light obtained through a Glan-Taylor prism polarizer was normalized to 100%.

<Measurement of the Content of Boric Acid in Polarizer>

The polarizers obtained in the examples and the comparative examples were subjected to attenuated total reflection (ATR) spectroscopy using polarized light as the measurement light and using a Fourier transform infrared spectrometer (FTIR) (Spectrum 2000 (trade name) manufactured by PerkinElmer, Inc.), in which the boric acid peak (665 cm$^{-1}$) intensity and the reference peak (2,941 cm$^{-1}$) intensity were measured. The boric acid amount index was calculated from the formula below using the resulting boric acid peak intensity and reference peak intensity, and then the boric acid content (% by weight) was determined from the formula below using the calculated boric acid amount index.

(Boric acid amount index)=(the intensity of the boric acid peak at 665 cm$^{-1}$)/(the intensity of the reference peak at 2,941 cm$^{-1}$)

(Boric acid content (% by weight))=(boric acid amount index)×5.54+4.1

(Measurement of Dynamic Friction Coefficient)

The dynamic friction coefficient of the pressure-sensitive-adhesive-layer-attached polarizing film obtained above on the protective film side was measured under the following conditions using the following measuring device.

Measuring device: HEIDON-TYPE 14D
Measurement condition
Moving speed: 300 mm/min
Moving distance: 100 mm
Load: 500 g
Sensitivity change: OUTPUT 25%
Tip material: Guitar pick (manufactured by HISTORY Company, model number "HP 2H (HARD)")

A pressure-sensitive-adhesive-layer-attached polarizing film (50 mm×150 mm, 50 mm in the absorption axis direction) was adhered to a glass plate, and the protective film was placed facing upward. Next, a force F (kgf) applied when a guitar pick was subjected to a 100 mm parallel displacement on the protective film was measured, and the dynamic friction coefficient was calculated from the following formula. For the numerical values used for the calculation, a stable value at a 30 mm parallel displacement in the measurement result was adopted.

Dynamic friction coefficient μ=Dynamic friction force $F$ (kgf)/Load 0.5 (kgf)

<Measurement of Compressive Elastic Modulus at 80° C.>

The compressive elastic modulus was measured using TI900 TriboIndenter (manufactured by Hysitron Inc.). A piece with a size of 10 mm×10 mm was cut from resulting transparent layer-attached, one-side-protected polarizing film 11, then fixed on the support attached to TriboIndenter, and then subjected to the measurement of compressive elastic modulus by nanoindentation method. In the measurement, the position of the indenter was so adjusted that it would indent a portion at or near the center of the transparent layer. The measurement conditions are shown below.

Indenter used: Berkovich (triangular pyramid type)
Measurement method: single indentation measurement
Measurement temperature: 80° C.
Indentation depth setting: 100 nm (Suppression of Occurrence of Nano-Slits: Guitar Pick Test (1): Without Surface Protective Film)

A sample 12 was obtained by cutting the obtained pressure-sensitive-adhesive-layer-attached polarizing film into a size of 50 mm×150 mm (50 mm in the absorption axis direction).

Figure 5A:
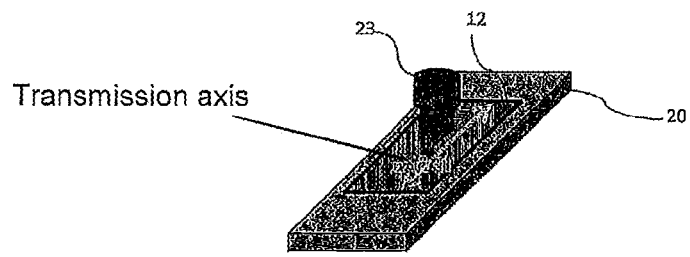
FIGS. 5A to 5E are schematic views illustrating items to be evaluated for nano-slits in examples and comparative examples.
Figure 5D:
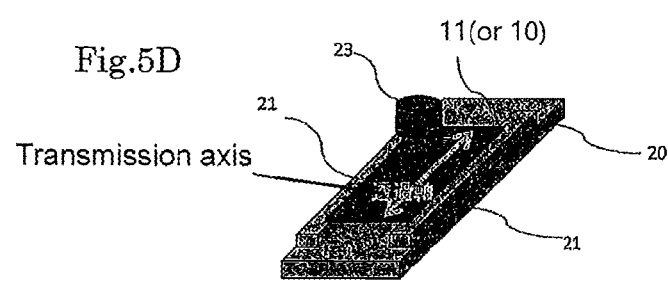
Figure 5E:
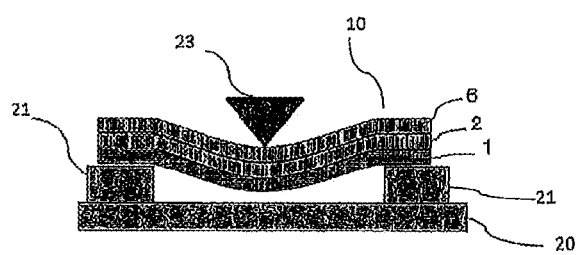
Figure 5B:
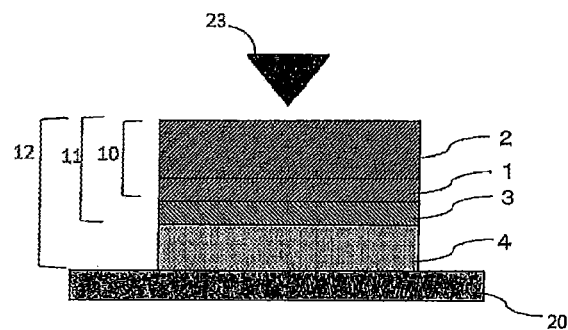

As shown in the schematic view of FIG. 5A and the cross-sectional view of FIG. 5B, on a substrate 20 (length 65 mm×width 165 mm×height 2mm), the cut sample 12 was placed in such a manner that the longitudinal direction of the substrate is parallel to the direction perpendicular to the absorption axis (transmission axis) of the polarizer 1 in the cut sample 12. In the sample 12, the separator was peeled off and the pressure-sensitive adhesive layer 4 was bonded to the substrate 20 to place the protective film 2 facing upward.

Subsequently, a load of 200 g was applied from a guitar pick (Model No. HP2H (HARD) manufactured by HISTORY) to the center of sample 12 (protective film 12 side), and the applied load was reciprocated 50 times within a distance of 100 mm in the direction perpendicular to the absorption axis of polarizer 1 of sample 12. The load was applied to one portion.

Subsequently, after sample 12 was allowed to stand in an environment at 80° C. for 1 hour, it was evaluated whether light-leaking cracks occurred in sample 12, based on the following criteria.

A: no cracks or 10 cracks or less
B: 11 to 50 cracks
C: 51 to 100 cracks
D: 101 to 500 cracks
E: 501 to 1000 cracks
F: 1001 or more cracks (Suppression of Occurrence of Nano-slits: Guitar Pick Test (2): With Surface Protective Film)

A sample 12 was obtained by cutting the obtained pressure-sensitive-adhesive-layer-attached polarizing film into a size of 50 mm×150 mm (50 mm in the absorption axis direction). In the sample 12 used, the surface protective film 6 for testing, which was prepared by the following method, was bonded to the side of the protective film 2. In the sample 12, the separator was peeled off and the pressure-sensitive adhesive layer 4 was bonded to the substrate 20, and the surface protective film 6 was placed facing upward.

(Surface Protective Film for Test)

A backing-foaming material of low-density polyethylene with a melt flow rate of 2.0 g/10 min at 190° C. and a density of 0.924 g/cm³ was supplied to an inflation molding machine for co-extrusion.

At the same time, a pressure-sensitive adhesive-foaming material of a propylene-butene copolymer (propylene: butene=85:15 in weight ratio, atactic structure) with a melt flow rate of 10.0 g/10 min at 230° C. and a density of 0.86 g/cm³ was supplied to the inflation molding machine with a die temperature of 220° C. and subjected to co-extrusion. A surface protective film composed of a 33-μm-thick backing layer and a 5-μm-thick pressure-sensitive adhesive layer was produced in this way.

Figure 5C:
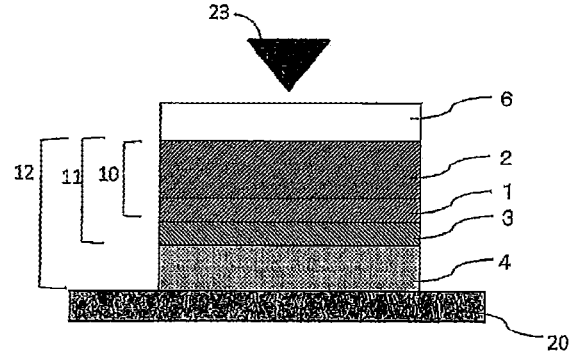

As shown in the schematic view of FIG. 5A and the cross-sectional view of FIG. 5C, the cut sample 12 was placed on the substrate 20 (length 65 mm×width 165 mm×height 2 mm) in such a manner that the longitudinal direction of the substrate is parallel to the direction perpendicular to the absorption axis (transmission axis) of the polarizer 1. In the cut sample 12, the surface protective film 6 was placed facing upward.

Subsequently, a load of 200 g was applied from a guitar pick (Model No. HP2H (HARD) manufactured by HISTORY) to the center of sample 12 (surface protective film 6 side), and the applied load was reciprocated 50 times within a distance of 100 mm in the direction perpendicular to the absorption axis of polarizer 1 of sample 12. The load was applied to one portion.

Subsequently, after sample 12 was allowed to stand in an environment at 80° C. for 1 hour, it was evaluated whether light-leaking cracks occurred in sample 12, based on the following criteria.

A: no cracks or 100 cracks or less
B: 101 to 500 cracks
C: 501 to 1000 cracks
D: 1001 or more cracks <Suppression of Expansion of Nano-Slits (Rock and Roll Test)>

In this test, scratches were formed on polarizer 1 of one-side-protected polarizing film 10 by the method described below, before the transparent layer was famed in each of the examples and the comparative examples. Thereafter, transparent layer-attached one-side-protected polarizing film 11 was prepared.

Subsequently, after transparent layer-attached one-side-protected polarizing film 11 was allowed to stand in an environment at 80° C. for 1 hour, it was evaluated whether light-leaking cracks occurred in sample 11, based on the following criteria.

A: No occurrence
B: Occurrence
C: Unevaluable (nano-slit did not occur in the polarizer of the one-side-protected polarizing film before forming the transparent resin layer)

<<How to Form Scratches>>

A piece with a size of 50 mm×150 m (50 mm in the absorption axis direction) was cut from resulting one-side-protected polarizing film 10. Sample 10 used was a laminate obtained by bonding surface protective film 6 for test (the surface protective film for test prepared as described above) to the protective film 2 side of the cut piece.

As illustrated in the schematic view of FIG. 5D and the cross-sectional view of FIG. 5E, two glass supports 21 of 25 mm wide×150 mm long×5 mm high were placed parallel at a distance of 115 mm between their inner sides on a substrate 20 (65 mm wide×165 mm long×2 mm high). Sample 10 obtained through the cutting was placed in such a manner that the direction perpendicular to the absorption axis of polarizer 1 of sample 10 was parallel to the longitudinal direction of the two glass supports and both sides of sample 11 were evenly supported on the two glass supports. Sample 10 was placed with surface protective film 6 facing upward.

Subsequently, a load of 100 g was applied from a guitar pick (Model No. HP2H (HARD) manufactured by HISTORY) to the center of sample 10 (surface protective film 6 side), and the applied load was reciprocated 10 times within a distance of 100 mm in the direction perpendicular to the absorption axis of polarizer 1 of sample 10, so that scratches were formed on the surface of polarizer 1. The load was applied to one portion. Subsequently, it was visually observed whether or not nano-slits occurred.

Figure 6B:
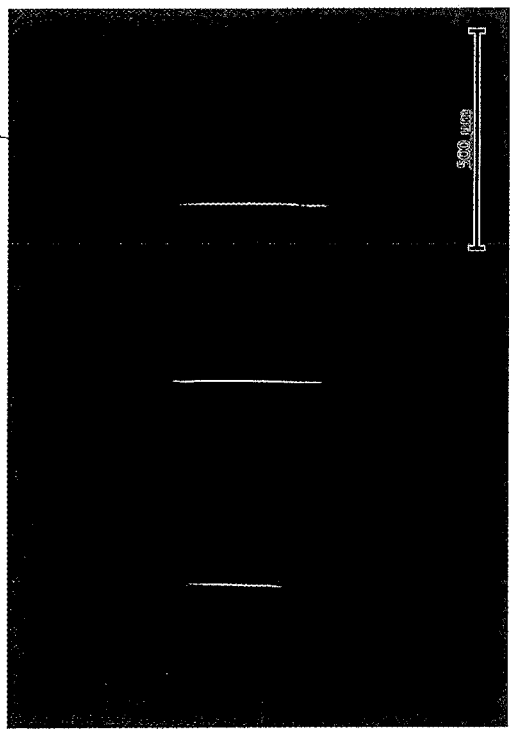
FIGS. 6A and 6B are exemplary photographs showing whether cracks are caused by nano-slits, for the evaluation of examples and comparative examples.
Figure 6A:
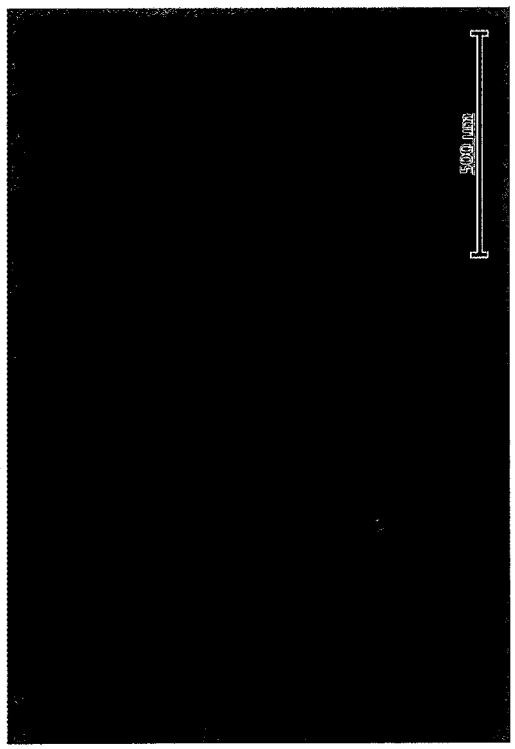

FIGS. 6A abd 6B shows an exemplary micrograph of the polarizing film surface, which provides the measure below for identifying light-leaking cracks (nano-slits a) in the guitar pick testing of a pressure-sensitive-adhesive-layer-attached polarizing film 12 and light-leaking cracks (nano-slits a) in the rock and roll testing of a one-side-protected polarizing film 10 or a transparent-layer-attached one-side-protected polarizing film 11. In FIG. 6A, light-leaking cracks due to nano-slits a have not been confirmed. On the other hand, FIG. 6B shows a case where three light-leaking cracks occur in the direction of the absorption axis of the polarizer due to nano-slits a formed by heating. In FIGS. 6A and 6B, a sample in which nano-slits occurred was observed with a differential interference microscope. When the sample was photographed, another sample with no nano-slits was placed on the lower side (transmitted light source side) of a sample with nano-slits in such a manner that these samples were in a crossed-Nicols arrangement, and then they were observed with transmitted light.

<Observation of Through Cracks (Heat Shock Test)>

A piece of 50 mm×150 mm (50 mm in the absorption axis direction) and a piece of 150 mm×50 mm (150 mm in the absorption axis direction) were cut from each resulting pressure-sensitive-adhesive-layer-attached polarizing film. The cut pieces were bonded in the directions of crossed Nicols to both sides a 0.5-mm-thick non-alkali glass sheet to form a sample. The sample was exposed to the environment of 100 cycles of heat shock from −40 to 85° C. each for 30 minutes. Subsequently, the sample was taken out and visually observed for the presence or absence of through cracks (and the number of through cracks) in the pressure-sensitive-adhesive-layer-attached polarizing film. This test was performed five times. The evaluation was performed according to the following.

○: No through crack is observed.

×: A through crack or cracks are observed.

Figure 7:
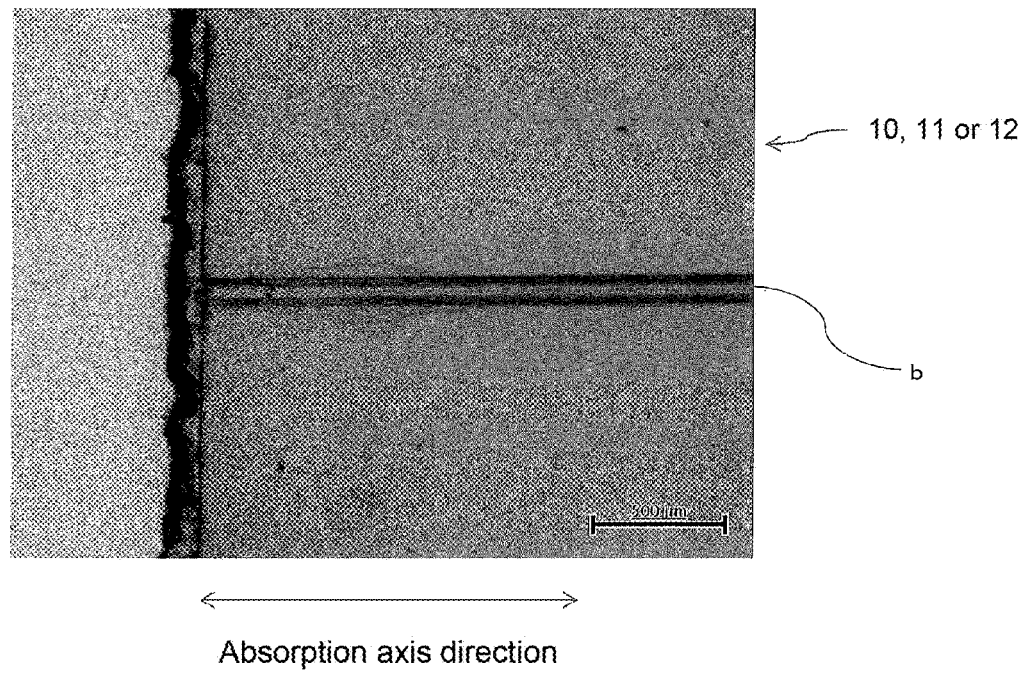
FIG. 7 is an exemplary photograph showing progress of a through crack for the evaluation of examples and comparative examples.

FIG. 7 is an exemplary micrograph of the polarizing film surface, which provides a measure for identifying a through crack b in pressure-sensitive-adhesive-layer-attached polarizing film 12. FIG. 7 was obtained by observing the sample suffering from a through crack using a differential interference microscope.

TABLE 1

| | One-side-protected polarizing film | | | | | Transparent resin layer | | | Evaluation | | | |
|---|---|---|---|---|---|---|---|---|---|---|---|---|
| | Polarizer | | | Protective film | | | | | Suppression of occurrence of nano-slits: guitar pick test | | Suppression of expansion of nano-slits: rock and roll test | Observation of through cracks: heat shock test |
| | | | | | | | | | (1) | (2) | | |
| | Type | Thickness (μm) | Boric acid content (%) | Type | Dynamic friction coefficient | Material | Compressive elastic modulus C (GPa) | Thickness (μm) | Without surface protective film | With surface protective film | | |
| Example 1 | A1 | 5 | 16.5 | 4 | 0.08 | PVA | 2.2 | 1.0 | A | A | A | o |
| Example 2 | A1 | 5 | 16.5 | 3 | 0.09 | PVA | 2.2 | 1.0 | A | A | A | o |
| Example 3 | A1 | 5 | 16.5 | 1 | 0.16 | PVA | 2.2 | 1.0 | B | A | A | o |
| Example 4 | A1 | 5 | 16.5 | 2 | 0.15 | PVA | 2.2 | 1.0 | B | A | A | o |
| Example 5 | A1 | 5 | 16.5 | 4 | 0.08 | PVA | 2.2 | 3.0 | A | A | A | o |
| Example 6 | A1 | 5 | 16.5 | 4 | 0.08 | PVA | 2.2 | 0.2 | B | A | A | o |
| Example 7 | A2 | 7 | 16.5 | 4 | 0.08 | PVA | 2.2 | 2.5 | A | A | A | o |
| Comparative Example 1 | A1 | 5 | 16.5 | 2 | 0.15 | Absent | | | E | D | B | o |
| Comparative Example 2 | A1 | 5 | 16.5 | 5 | 0.24 | PVA | 2.2 | 1.0 | c | A | A | o |
| Comparative Example 3 | B | 12 | 23.5 | 1 | 0.16 | Absent | | | A | A | c | x |

DESCRIPTION OF REFERENCE SIGNS

1 Polarizer

2, 2' Protective film x Surface treatment layer

3 Transparent layer

4 Pressure-sensitive adhesive layer

5, 5a, 5b Separator

6, 6a, 6b Surface protective film

10 One-side-protected polarizing film

11 One-side-protected polarizing film (with transparent layer)

12 Pressure-sensitive-adhesive-layer-attached polarizing film

The invention claimed is:

1. A pressure-sensitive-adhesive-layer-attached polarizing film comprising a one-side-protected polarizing film and a pressure-sensitive adhesive layer,
the one-sided-protected polarizing film comprising,
   a polarizer; and
   a protective film provided on only one surface of the polarizer, wherein
   the pressure-sensitive adhesive layer is provided on the transparent layer of the one-side-protected polarizing film,
   the polarizer contains a polyvinyl alcohol-based resin, has a thickness of 10 µm or less, and is configured so that optical properties represented by a single-body transmittance T and a polarization degree % P satisfy the following relationship:

$P > -(10^{0.929T-42.4}-1) \times 100$ when $T<42.3$ or $P \geq 99.9$ when $T \geq 42.3$, a transparent layer is provided on another surface of the polarizer, and
   a dynamic friction coefficient of the surface on which the protective film is provided is 0.2 or less.

2. The pressure-sensitive-adhesive-layer-attached polarizing film according to claim 1, wherein the transparent layer is a formed product of a resin material.

3. The pressure-sensitive-adhesive-layer-attached polarizing film according to claim 2, wherein the transparent layer is a formed product of a forming material containing a polyvinyl alcohol-based resin or a forming material containing an aqueous emulsion.

4. The pressure-sensitive-adhesive-layer-attached polarizing film according to claim 1, wherein the transparent layer has a thickness of 0.2 µm or more and 3 µm or less.

5. The pressure-sensitive-adhesive-layer-attached polarizing film according to claim 1, wherein a surface treatment layer is provided on the surface of the protective film.

6. The pressure-sensitive-adhesive-layer-attached polarizing film according to claim 1, wherein the polarizer contains 20% by weight or less of boric acid based on the total weight of the polarizer.

7. The pressure-sensitive-adhesive-layer-attached polarizing film according to claim 1, further comprising a separator provided on the pressure-sensitive adhesive layer.

8. The pressure-sensitive-adhesive-layer-attached polarizing film according to claim 7, which is in the form of a roll.

9. A method for continuously producing an image display device, the method comprising the steps of:
   unwinding the pressure-sensitive-adhesive-layer-attached polarizing film from the roll of the pressure-sensitive-adhesive-layer-attached polarizing film according to claim 8;
   feeding the pressure-sensitive-adhesive-layer-attached polarizing film with the separator; and
   continuously bonding the pressure-sensitive-adhesive-layer-attached polarizing film to a surface of an image display panel with the pressure-sensitive adhesive layer interposed therebetween.

10. An image display device comprising the pressure-sensitive-adhesive-layer-attached polarizing film according to claim 1.

11. A pressure-sensitive-adhesive-layer-attached polarizing film comprising a one-side-protected polarizing film and a pressure-sensitive adhesive layer,
the one-sided-protected polarizing film comprising,
   a polarizer; and
   a protective film provided on only one surface of the polarizer, wherein
   the pressure-sensitive adhesive layer is provided on the protective film of the one-side-protected polarizing film,
   the polarizer contains a polyvinyl alcohol-based resin, has a thickness of 10 µm or less, and is configured so that optical properties represented by a single-body transmittance T and a polarization degree % P satisfy the following relationship:

$P > -(10^{0.929T-42.4}-1) \times 100$ when $T<42.3$ or $P \geq 99.9$ when $T \geq 42.3$, a transparent layer is provided on another surface of the polarizer, and
   a dynamic friction coefficient of the surface on which the protective film is provided is 0.2 or less.

12. An image display device comprising the pressure-sensitive-adhesive-layer-attached polarizing film according to claim 11.

13. The pressure-sensitive-adhesive-layer-attached polarizing film according to claim 11, wherein the transparent layer is a formed product of a resin material.

14. The pressure-sensitive-adhesive-layer-attached polarizing film according to claim 13, wherein the transparent layer is a formed product of a forming material containing a polyvinyl alcohol-based resin or a forming material containing an aqueous emulsion.

15. The pressure-sensitive-adhesive-layer-attached polarizing film according to claim 11, wherein the transparent layer has a thickness of 0.2 µm or more and 3 µm or less.

16. The pressure-sensitive-adhesive-layer-attached polarizing film according to claim 11, wherein a surface treatment layer is provided on the surface of the protective film.

17. The pressure-sensitive-adhesive-layer-attached polarizing film according to claim 11, wherein the polarizer contains 20% by weight or less of boric acid based on the total weight of the polarizer.

18. The pressure-sensitive-adhesive-layer-attached polarizing film according to claim 11, further comprising a separator provided on the pressure-sensitive adhesive layer.

19. The pressure-sensitive-adhesive-layer-attached polarizing film according to claim 18, which is in the form of a roll.

20. A method for continuously producing an image display device, the method comprising the steps of:
   unwinding the pressure-sensitive-adhesive-layer-attached polarizing film from the roll of the pressure-sensitive-adhesive-layer-attached polarizing film according to claim 19;
   feeding the pressure-sensitive-adhesive-layer-attached polarizing film with the separator; and
   continuously bonding the pressure-sensitive-adhesive-layer-attached polarizing film to a surface of an image display panel with the pressure-sensitive adhesive layer interposed therebetween.

* * * * *